United States Patent
Ohishi

(10) Patent No.: US 11,157,442 B2
(45) Date of Patent: Oct. 26, 2021

(54) INFORMATION PROCESSING APPARATUS, INFORMATION PROCESSING SYSTEM, AND INFORMATION PROCESSING METHOD

(71) Applicant: Tsutomu Ohishi, Fukuoka (JP)

(72) Inventor: Tsutomu Ohishi, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 267 days.

(21) Appl. No.: 16/033,546

(22) Filed: Jul. 12, 2018

(65) Prior Publication Data

US 2019/0018852 A1 Jan. 17, 2019

(30) Foreign Application Priority Data

Jul. 14, 2017 (JP) .............................. JP2017-138534
Jul. 10, 2018 (JP) .............................. JP2018-131024

(51) Int. Cl.
*G06F 16/335* (2019.01)
*G06F 16/11* (2019.01)
*H04W 4/70* (2018.01)
*G06F 16/17* (2019.01)
*G06F 16/903* (2019.01)
*H04L 29/08* (2006.01)

(52) U.S. Cl.
CPC ........ *G06F 16/122* (2019.01); *G06F 16/1734* (2019.01); *G06F 16/335* (2019.01); *G06F 16/90335* (2019.01); *H04W 4/70* (2018.02); *H04L 67/125* (2013.01); *H04L 67/2828* (2013.01)

(58) Field of Classification Search
None
See application file for complete search history.

(56) References Cited

U.S. PATENT DOCUMENTS

2013/0290305 A1* 10/2013 Feng .................... H04W 4/70
707/722
2014/0040462 A1 2/2014 Harada
(Continued)

FOREIGN PATENT DOCUMENTS

| JP | 2014-032627 | 2/2014 |
| JP | 2014-235441 | 12/2014 |
| JP | 2018-092219 | 6/2018 |

*Primary Examiner* — Giuseppi Giuliani
(74) *Attorney, Agent, or Firm* — Harness, Dickey & Pierce, P.L.C.

(57) ABSTRACT

An information processing apparatus includes: a memory to store report policy information for determining filtering processing to be applied to log data to be transmitted to a server. The report policy information associates, for each report policy, information defining a condition for applying filtering processing to the log data and information indicating a type of filtering processing to be applied to the log data. The information processing apparatus further includes circuitry to: receive, from each of a plurality of devices through a second network, log data indicating a log of processes that have been executed by the device; specify, from among the received log data, log data that matches the condition for applying filtering processing; apply filtering processing to the specified log data; and transmit the log data to which the filtering processing is applied, to the server through the first network.

20 Claims, 20 Drawing Sheets

(56) References Cited

U.S. PATENT DOCUMENTS

| | | | |
|---|---|---|---|
| 2016/0179962 A1* | 6/2016 | Patten | H04L 67/12 |
| | | | 707/706 |
| 2017/0195136 A1* | 7/2017 | Ghosh | H04L 45/04 |
| 2018/0074933 A1* | 3/2018 | Neystadt | G06F 11/3072 |
| 2018/0150041 A1 | 5/2018 | Ohishi et al. | |
| 2018/0316655 A1* | 11/2018 | Mani | H04L 61/1541 |
| 2018/0337958 A1* | 11/2018 | Nagarkar | H04L 63/205 |

* cited by examiner

FIG. 10

| CONTROL FLOW NAME | CONDITION | | PROCESSING | | |
|---|---|---|---|---|---|
| CONTROL AIR CONDITIONER | 8AM to 20PM, WEEK DAY | TEMPERATURE SENSOR 28°C AND HIGHER | ... | AIR CONDITIONER POWER ON | SET TEMPERATURE AT 25°C | ... |
| CONTROL AIR CONDITIONER | 8AM to 20PM, WEEK DAY | TEMPERATURE SENSOR 22°C AND LOWER | ... | AIR CONDITIONER POWER ON | SET TEMPERATURE AT 25°C | ... |

DATA FILTER POLICY

| IoT DEVICE NAME | FILTER ON/OFF SETTINGS |
|---|---|
| AIR CONDITIONER | ON |
| ELECTRONIC WHITEBOARD | OFF |
| PROJECTOR | OFF |
| LIGHT | ON |
| ... | ... |

FIG. 14

IoT DEVICE CONTROL POLICY

| IoT DEVICE NAME | ROLE | PROCESSING | | |
|---|---|---|---|---|
| AIR CONDITIONER | ADMINISTRATOR | POWER ON/OFF ALLOWED | TEMPERATURE SETTING ALLOWED | ... |
| AIR CONDITIONER | GENERAL USER | POWER ON/OFF PROHIBITED | TEMPERATURE SETTING PROHIBITED | ... |
| TEMPERATURE SENSOR | ALL | TEMPERATURE READING ALLOWED | ... | ... |

FIG. 16

| POLICY NAME | USER | INSTALLATION PLACE | IoT DEVICE NAME (MACHINE NAME) | ID (IoT DEVICE) | DATA FOR FILTERING | FILTERING PROCESSING |
|---|---|---|---|---|---|---|
| POLICY 1 | AAA (PRESIDENT) | — | ELECTRONIC WHITEBOARD | — | OPERATION DATA (INCLUDING STROKE DATA) | ENCRYPT |
| POLICY 2 | — | PRESIDENT ROOM | ELECTRONIC WHITEBOARD | — | OPERATION DATA (INCLUDING STROKE DATA) | DELETE |
| POLICY 3 | — | — | PROJECTOR (PJ) | — | ALL | DELETE FROM DATA FOR TRANSMISSION |
| POLICY 4 | — | MEETING ROOM C | MFP | 444 | IMAGE LOG IN IoT DEVICE DATA | CHANGE TO IMAGE LOG URI OR ADDRESS DATA OF IMAGE LOG SERVER STORING IMAGE LOG |

FIG. 17A

ELECTRONIC WHITEBOARD DATA

| MACHINE NAME | ID | INSTALLA-TION PLACE | TIME | USER | OPERATION | OPERATION DATA |
|---|---|---|---|---|---|---|
| ELECTRONIC WHITEBOARD | 111 | OFFICE 1 | 20170501133010 | AAA (PRESIDENT) | POWER ON | — |
| ELECTRONIC WHITEBOARD | 111 | OFFICE 1 | 20170501133520 | AAA (PRESIDENT) | STROKE | OPERATION DATA (INCLUDING STROKE DATA) |
| ELECTRONIC WHITEBOARD | 111 | OFFICE 1 | 20170501133530 | AAA (PRESIDENT) | STROKE | OPERATION DATA (INCLUDING STROKE DATA) |
| ELECTRONIC WHITEBOARD | 111 | OFFICE 1 | 20170501140245 | AAA (PRESIDENT) | POWER OFF | — |
| ... | ... | ... | ... | ... | ... | ... |

FIG. 17B

ELECTRONIC WHITEBOARD DATA

| MACHINE NAME | ID | INSTALLA-TION PLACE | TIME | USER | OPERATION | OPERATION DATA | ... |
|---|---|---|---|---|---|---|---|
| ELECTRONIC WHITEBOARD | 111 | OFFICE 1 | 20170501133010 | AAA (PRESIDENT) | POWER ON | — | ... |
| ELECTRONIC WHITEBOARD | 111 | OFFICE 1 | 20170501133520 | AAA (PRESIDENT) | STROKE | ENCRYPTED OPERATION DATA | ... |
| ELECTRONIC WHITEBOARD | 111 | OFFICE 1 | 20170501133530 | AAA (PRESIDENT) | STROKE | ENCRYPTED OPERATION DATA | ... |
| ELECTRONIC WHITEBOARD | 111 | OFFICE 1 | 20170501140245 | AAA (PRESIDENT) | POWER OFF | — | ... |
| ... | ... | ... | ... | ... | ... | ... | ... |

FIG. 18A

ELECTRONIC WHITEBOARD DATA

| MACHINE NAME | ID | INSTALLATION PLACE | TIME | USER | OPERATION | OPERATION DATA |
|---|---|---|---|---|---|---|
| ELECTRONIC WHITEBOARD | 111 | PRESIDENT ROOM | 20170501133010 | BBB | POWER ON | - |
| ELECTRONIC WHITEBOARD | 111 | PRESIDENT ROOM | 20170501133520 | BBB | STROKE | OPERATION DATA (INCLUDING STROKE DATA) |
| ELECTRONIC WHITEBOARD | 111 | PRESIDENT ROOM | 20170501133530 | BBB | STROKE | OPERATION DATA (INCLUDING STROKE DATA) |
| ELECTRONIC WHITEBOARD | 111 | PRESIDENT ROOM | 20170501140245 | BBB | POWER OFF | - |
| ... | ... | ... | ... | ... | ... | ... |

FIG. 18B

ELECTRONIC WHITEBOARD DATA

| MACHINE NAME | ID | INSTALLATION PLACE | TIME | USER | OPERATION | OPERATION DATA |
|---|---|---|---|---|---|---|
| ELECTRONIC WHITEBOARD | 111 | PRESIDENT ROOM | 20170501133010 | BBB | POWER ON | - |
| ELECTRONIC WHITEBOARD | 111 | PRESIDENT ROOM | 20170501140245 | BBB | POWER OFF | - |
| ... | ... | ... | ... | ... | ... | ... |

INFORMATION PROCESSING APPARATUS, INFORMATION PROCESSING SYSTEM, AND INFORMATION PROCESSING METHOD

CROSS-REFERENCE TO RELATED APPLICATIONS

This patent application is based on and claims priority pursuant to 35 U.S.C. § 119(a) to Japanese Patent Application Nos. 2017-138534, filed on Jul. 14, 2017, and 2018-131024, filed on Jul. 10, 2018, in the Japan Patent Office, the entire disclosure of each of which is hereby incorporated by reference herein.

BACKGROUND

Technical Field

The present invention relates to an information processing apparatus, an information processing system, and an information processing method.

Description of the Related Art

Recently, Internet (IoT) of things that connect, not only personal computers (PCs), but also other devices ("things") to the Internet is known. For example, a device management server may be provided, which collectively manages a plurality of devices based on data acquired from each device via a network such as the Internet.

Machine-to-machine (M2M) communication is also known, in which machines communicate with each other via a network to automatically execute machine control without intervention by a human. In the M2M communication, services are provided based on data transmitted from a device performing the M2M communication (M2M device) via the network.

SUMMARY

Example embodiments of the present invention include an information processing apparatus communicably connected with a server through a first network, including: a memory to store report policy information for determining filtering processing to be applied to log data to be transmitted to the server. The report policy information associates, for each one of one or more report policies available for use by the information processing apparatus, information defining a condition for applying filtering processing to the log data and information indicating a type of filtering processing to be applied to the log data. The information defining the condition for applying filtering processing includes a type of the log data to be filtered and attribute information of a device that has executed processes that caused generation of the log data. The information processing apparatus further includes circuitry to: receive, from each of a plurality of devices through a second network different than the first network, log data indicating a log of processes that have been executed by the device; specify, from among the received log data, log data that matches the condition for applying filtering processing of the report policy information; apply filtering processing associated with the matched condition for applying filtering processing of the report policy information, to the specified log data; and transmit the log data to which the filtering processing is applied, to the server through the first network, to cause the server to store the log data received from the information processing apparatus.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 10 is an illustration of an example structure of control flow data;

FIG. 14 is an illustration of an example structure of an IoT device control policy;

FIG. 16 is an illustration of an example structure of a report policy;

FIGS. 17A and 17B are diagrams for explaining filtering processing applied to the IoT device data by the IoT controller according to the report policy of FIG. 16, according to an embodiment;

FIGS. 18A and 18B are diagrams for explaining filtering processing applied to the IoT device data by the IoT controller according to the report policy of FIG. 16, according to an embodiment;

Figure 1:
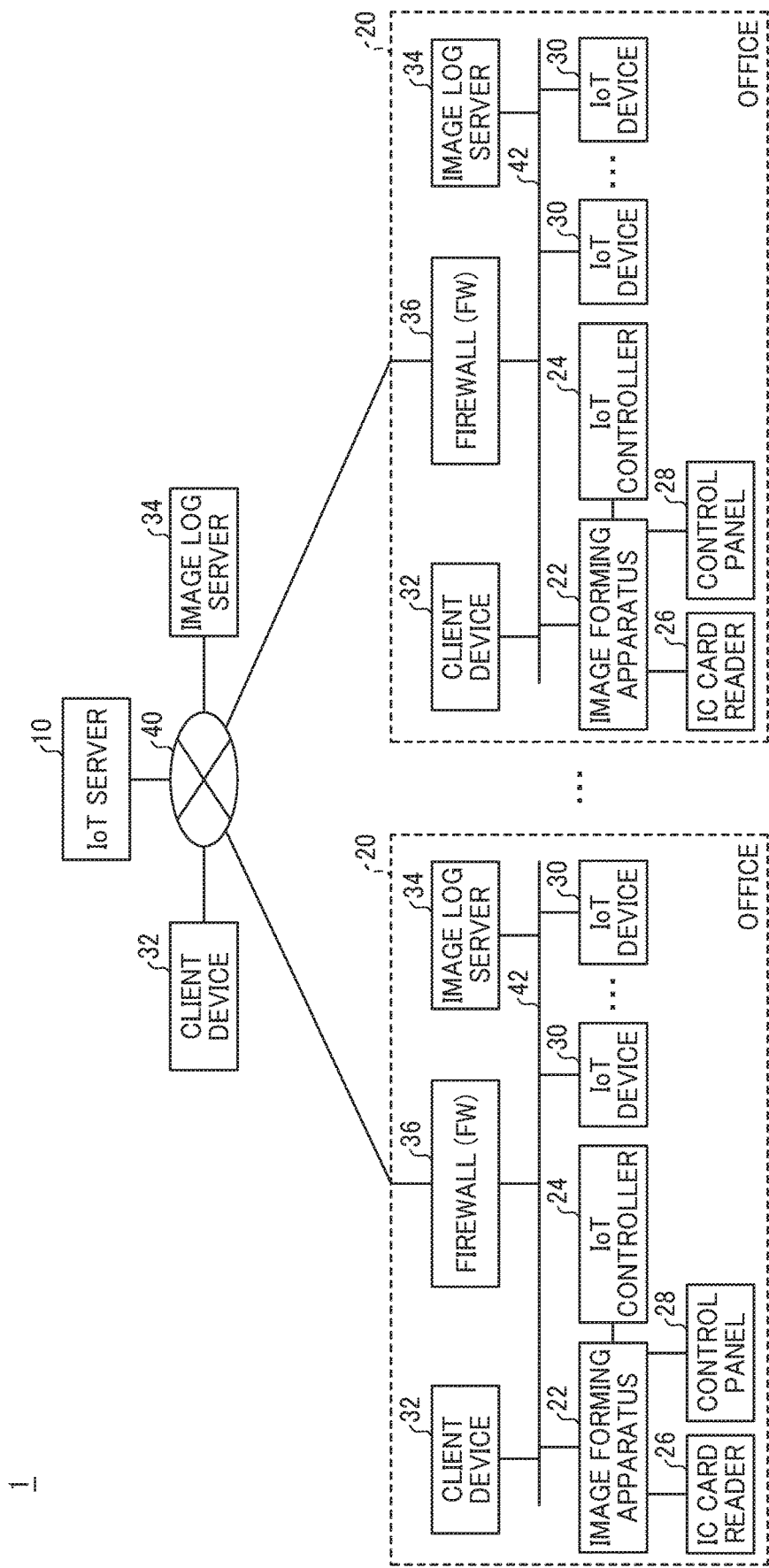
FIG. 1 is a schematic diagram illustrating an example configuration of an information processing system according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

The IoT communication and the M2M communication are examples of a system in which various types of devices connected via an internal network constructed in a user's environment, are further connected to an external network for access by a device on the external network. Here, the internal network corresponds to a network constructed in the user's environment such as a local area network, and the external network corresponds to a network external to the user's environment such as the Internet. To ensure security, a firewall is usually provided at the internal network, which blocks any access from the external network. This, however, may lower operability of the user.

For example, taking an office as an example of user's environment, the user may want to collect data, such as log data, from various types of devices provided in each office for analysis. In such case, a centralized server is usually provided on the external network (such as the Internet) to collect data, such as log data, from various devices on the internal network, and analyze the collected data for later use. Yet, it is also desirable to prohibit an access to some data from the server on the external network, for example, to ensure security. Such demands, which may sometimes conflict with each other, are not limited to offices, but may occur commonly in various user environments such as hospitals, factories, shops, exhibition halls, and homes.

In view of the above, filtering may be applied so that some information is filtered out, when transmitting data to the external network. For example, personal information, such as telephone numbers or email addresses, may be data that should be prohibited from the access from the external network. In such case, before transmitting the data collected from various devices to the server on the external network, personal information may be filtered out or encrypted to improve security.

However, the inventor of the present invention has realized that types of information to be secured may differ among users, or that types of information to be collected may differ among users. Assuming that the user belongs to a specific company, in some cases, the company may not want to allow the external device to access log data indicating a log of processes performed by a specific person or performed by a device placed in a specific location. For example, the company may decide to filter out log data of a device used by the president of the company, while allowing collection of log data of a device used by an employee. In another example, the company may decide to filter out log data of a device generated at a specific device, as such log data is not useful for data analysis.

That is, a policy (a scheme) to be used for determining whether to filter out certain log data tends to vary for each user due to individual circumstances of the user, rather than a type of data itself. The individual circumstances of the user may depend on various factors including, for example, an organization such as a company or a department to which the user operating or managing the device belongs, and application of the collected log data. Accordingly, it has been difficult to respond to such individual circumstances of the user only by looking into the type of information based on the contents of the data.

On the other hand, a policy for filtering out certain log data may be set for each device in the user's environment, according to a user operating the device. However, it would take a huge amount of time to set or update each device, with the policy reflecting such user-specific circumstances, to cause each device to transmit log data according to the policy. Further, managing updates on such policy, which may differ among different user's environments, would be difficult if such policy is to be managed individually at each device.

The following describes one or more embodiments, in which a system allows the user to set a policy for filtering certain log data based on individual circumstances of the user. More specifically, as described below, an IoT controller is provided in the user's environment, which controls filtering processing of data collected from each device in the user's environment according to a policy set by the user. Further, the IoT controller in the user's environment is communicable with an IoT server on the external network, such that any change in the policy for filtering is centrally managed at the IoT server.

Referring now to the drawings, one or more embodiments of the present invention are described.

System Configuration

FIG. 1 is an example configuration of an information processing system 1 according to an embodiment. The information processing system 1 connects between a plurality of sites 20 that are remotely located from each other. The site 20 in this example corresponds to a workplace such as an office in which a plurality of electronic devices is available.

The information processing system 1 of FIG. 1 includes various types of electronic device provided in each site 20. For the descriptive purposes, any number of electronic devices may be collectively referred to as the IoT device 30.

The information processing system 1 of FIG. 1 further includes, for each site 20, an image forming apparatus 22, as an example of an electronic device provided with an IoT controller 24. Specifically, the image forming apparatus 22 is connected to the IoT controller 24, an IC card reader 26, and a control panel 28. The information processing system 1 of FIG. 1 further includes, for each site, a client device 32, as an example of an operation terminal operated by a user. The information processing system 1 of FIG. 1 further includes an image log server 34, as an example of a log server that stores a log of images that has been generated or processed by any electronic device in the information processing system 1.

In one example, the image log server 34 is a server, which stores image data scanned by the image forming apparatus 22, as a log. The image forming apparatus 22 scans an original into image data, and transmits the image data to the image log server 34. In this way, the image data that is scanned may be managed as a log, without causing the image forming apparatus 22 to keep storing the image data in a memory. With the image log server 34, a memory space of the image forming apparatus 22 can be efficiently used, for example, to store data collected from one or more IoT devices 30 at the site 20.

The image forming apparatus 22, the IoT devices 30, and the client device 32 at each site, are communicably connected via an IoT network 42 such as a local area network (LAN). The IoT network 42 is connected to an IoT server 10 via a firewall 36 through a network 40 such as the Internet. As illustrated in FIG. 1, any number of client devices 32 and image log servers 34 may be connected to the network 40.

The IoT server 10 provides policy data and control flow data to the IoT controller 24 at each site. The IoT server 10 stores report data transmitted from the IoT controller 24 at each site, which is generated based on IoT device data collected at each site according to the policy data and the control flow data. As mentioned above, in this example, the image forming apparatus 22 is an example of an electronic device that cooperates with the IoT controller 24 to perform operation of processing data collected from the IoT devices 30.

Other examples of the electronic device include, but not limited to, a laser printer, multifunctional printer, projector, electronic whiteboard, teleconference or video conference system, industrial electronic device having communication function, home appliance having communication function, and medical equipment having communication function. In the following, it is assumed that an electronic device is implemented as the image forming apparatus 22. The image forming apparatus 22 is capable of authenticating a user using data obtained from the IC card reader 26. Further, through the control panel 28, the image forming apparatus 22 displays information to the user or accepts instructions from the user.

Even if the electronic device is implemented as any device other than the image forming apparatus 22, these basic functions of user authentication and displaying are assumed to be performed similarly by such electronic device. Further, in alternative to authenticating the user using the IC card, the user may be authenticated using any other authentication information such as a user ID and a password input by the user, or even with biological information of the user.

The IoT controller 24 is an example of information processing apparatus. Using the communication function of the image forming apparatus 22, the IoT controller 24 communicates with, for example, the IoT server 10, the IoT device 30, and the image log server 34. In case the IoT controller 24 is provided with a communication function such as a wireless communication module, the IoT controller 24 communicates with the IoT server 10, IoT device 30, and image log server 34 using its own communication function. While the IoT controller 24 is connected to the image forming apparatus 22 in this example, the IoT controller 24 may be incorporated in the image forming apparatus 22 in the form of an extension board. In case the IoT controller 24 is external to the image forming apparatus 22, the IoT controller 24 may be attached to housing of the image forming apparatus 22 or provided near the image forming apparatus 22. In case the IoT controller 24 is incorporated in the image forming apparatus 22 (electronic device), the electronic device operates as an information processing apparatus having the function of the IoT controller 24. For example, software for achieving the function of the IoT controller 24 described later may be operated on the electronic device.

The IoT controller 24 stores the policy data and the control flow data, provided from the IoT server 10, in a memory. The control flow data provided from the IoT server 10 is, for example, control flow data for collectively managing operations of the IoT devices 30 within a specific organization such as a company.

The IoT controller 24 further stores control flow data generated at the image forming apparatus 22 in the memory, in addition to the control flow data provided from the IoT server 10. The control flow data generated at the image forming apparatus 22 is, for example, control flow data for individually controlling operations of a specific group of IoT devices 30 in the organization. In this example, the group is any unit of an organization. The unit of the organization may be represented using a physical location such as a location of an office (such as Tokyo, when the office is located in Tokyo) or may be represented using a structure within the organization such as a name of a department. For the descriptive purposes, in this embodiment, it is assumed that such group-specific control flow data is generated for each site 20.

The IoT controller 24 controls operation of the IoT device 30 according to a control flow selected by the user. For example, when the IoT controller 24 receives the IoT device data (log data) from the IoT device 30, the IoT controller 24 determines whether the received IoT device data matches a condition for starting execution of the selected control flow. Based on the match, the IoT controller 24 controls the IoT device 30 according to the selected control flow. The selected control flow is, for example, a control flow that is made valid (effective control flow) according to a selection by the user. For example, the IoT controller 24 controls the IoT devices 30 provided in the same office (such as in the same site 20) according to the selected group-specific control flow, as the IoT devices 30 belonging to the same group.

In response to reception of the IoT device data from the IoT device 30, the IoT controller 24 performs filtering on the received IoT device data according to data filter policy that is previously set, and stores the processed IoT device data in the memory.

The IoT controller 24 generates report data based on the processed IoT device data, which is obtained by applying filtering to the IoT device data, according to report policy that is previously set. The IoT controller 24 transmits the generated report data to the IoT server 10. The data filter policy and the report policy are included in the policy data provided by the IoT server 10. Alternatively, the policy data, that is, the data filter policy and the report policy, may be generated, selected, or modified by the user at the site 20, as described below referring to FIGS. 20 and 21.

As described above, the IoT device in the present embodiment refers to an electronic device connected to a network to implement the Internet (IoT) system. Such electronic device is provided with a communication interface assigned with a specific address for network communication, or implemented as a sensor.

Specific examples of electronic device include, but not limited to, a personal computer (PC), a mobile device such as a smartphone or a tablet terminal, a wearable device, an air conditioner, a lighting device, an image forming apparatus such as a multifunction peripheral, a printer or a scanner, an electronic whiteboard, a projector, a sensor such as a temperature sensor or an acceleration sensor, a camera, and a teleconference or videoconference system. Other examples of electronic device include a refrigerator, a television, or any other home appliance in case the user environment is home. In case the user environment is other workplace such as a factory or a hospital, examples of electronic device include a vending machine, or any other equipment in the workplace.

The mobile device as an example of the IoT device is, for example, a smartphone, a tablet terminal, or any other portable communication terminal, which is capable of communicating with the image forming apparatus 22 via short-range wireless communication. The smart phone is provided with, in addition to the communication function, a plurality of functions usually provided by the generic PC such as an image capturing function using a camera and a Webpage displaying function. The tablet terminal is any information processing terminal, in a tablet form, capable of providing a plurality of functions similar to the functions provided by the PC.

The wearable device is typically an electronic device that can be mounted on a part of a user body (such as a head, wrist, or chest), as a goggle, a watch, or a neck stripe. Alternatively, the wearable device may be mounted on any item possessed by a user, such as a hat, a bag such as a school bag, or the like. For the descriptive purposes, in this disclosure, the mobile device collectively includes both a wearable device that the user can wear, and a mobile or portable device that the user can easily carry. The mobile device may be placed in a pocket of clothing, may be attached to a part of user body (head, wrist, or chest), or may be held in user's hand.

As describe above, in this embodiment, the IoT device 30 is any device such as an air conditioner, a light, an image forming apparatus such as a multifunction peripheral, an electronic whiteboard, a projector, a sensor such as a temperature sensor, etc. in the office. The IoT device 30, which is registered to the IoT controller 24, transmits the IoT device data to the IoT controller 24. For example, when the IoT device 30 is a temperature sensor, the IoT device data is an output (temperature data) of the temperature sensor. In another example, when the IoT device 30 is an air conditioner, the IoT device data indicates an ON/OFF of the air conditioner, a set temperature, and the like. In another example, when the IoT device 30 is an electronic whiteboard, the IoT device data is an image drawn by the user such as stroke data.

The control panel 28 is implemented by, for example, a computer such as a tablet PC. The control panel 28 is installed with application such as a web browser that provides a screen displaying function. Such application is not limited to the web browser, as long as the application provides the screen displaying function for displaying a control flow generation screen to allow the user to generate the control flow data. For example, the control panel 28 may be implemented by any display, other than the computer.

Note that the configuration of the information processing system 1 in FIG. 1 is merely an example, and one or more servers (a proxy server, a gateway server, etc.) may be disposed between the firewall 36 and the IoT server 10.

In this example, the image forming apparatus 22 is the IoT device 30 provided with the IoT controller 24. To operate in cooperation with the IoT server 10 (and other IoT device 30), each IoT device 30 is previously stored with an IP address of the IoT server 10 (or the IoT device 30 having the IoT controller 24), and a port number corresponding to a communication interface.

Each IoT device 30 periodically sends a polling message to the IP address of the IoT server 10 and the port number, via the communication interface, to inquire about the occurrence of any event. The inquiry includes, for example, identification information for identifying a communication destination for the IoT device 30 such as a device number (or any device identifier) assigned to the IoT device 30. If the device number in the inquiry matches a device number stored in the IoT server 10, the communication interface of the IoT server 10 transmits various data such as policy data to the IoT device 30 identified with the device number in the inquiry.

It should be noted that the device number is an example of identification information for identifying a communication destination of the IoT server 10, such that any other type of identification information may be used. Other examples of identification information for identifying the communication destination for the IoT server 10 include address information identifying the IoT device 30 on the network, and identification information assigned to the IoT device 30 by a service provider or an administrator.

In addition, the identification information for identifying the communication destination for the IoT server 10 may be changed by the service provider or the administrator. For example, the identification information for identifying the communication destination stored in the IoT device 30 may be changed by direct operation on the IoT device 30 or operation from the client device 32 that accesses the IoT device 30 via the network 42. Further, the identification information for identifying the communication destination may be stored in a recording medium 503a such as a SIM card attached to the IoT device 30. Through changing the recording medium to be read, identification information for identifying a communication destination assigned to the IoT device 30 can be easily changed.

Further, the IoT device 30 having the IoT controller 24 and the IoT device 30 not having the IoT controller 24 may be managed by the IoT server 10 so as to be distinguishable from each other. For example, the identification information of the IoT device 30 having the IoT controller 24 and the identification information of the IoT device 30 not having the IoT controller 24 may be managed by separate tables. In another example, flag information indicating whether the IoT controller 24 is included or not may be associated with the identification information for identifying the IoT device 30. In another example, depending on whether the IoT device 30 has the IoT controller 24 or not, the identification information to be assigned to the IoT device 30 may be made different.

In this embodiment, the IoT server 10 transmits various data such as policy data to the IoT device 30 having the IoT controller 24. For example, only the IoT device 30 having the IoT controller 24 may request the IoT server 10 for various data such as policy data. The process in which the IoT controller 24 acquires various data such as policy data from the IoT server 10 will be described later in detail with reference to FIG. 9.

Here, communication between the IoT server 10 and the IoT device 30 is described. Communication between the IoT device 30 having the IoT controller 24 and the other IoT device 30 not having the IoT controller 24 is performed in a substantially similar manner as described above. Specifically, the other IoT device 30 not having the IoT controller 24 transmits a polling message to the IoT controller 24 to which the other IoT device 30 is registered, to inquire about occurrence of any event.

However, if the firewall 36 does not exist between any IoT device 30 at the local site (that is, office) and the IoT server 10 on the network 40, the communication interface of the IoT server 10 may transmit various data such as policy data to each IoT device 30, for example, periodically or at a time when an event is detected.

In such case, the IP address and the port number etc. of the IoT device 30 may be stored in a policy data storage 55 (FIG. 5) of the IoT server 10 as a part of device information regarding the IoT device 30 that has been registered. Similarly, the communication between the IoT controller 24 (that is, the IoT device 30 having the IoT controller 24) and the other IoT device 30 registered to the IoT controller 24 may be performed in any direction even without polling, when the firewall 36 is not provided.

Figure 19:
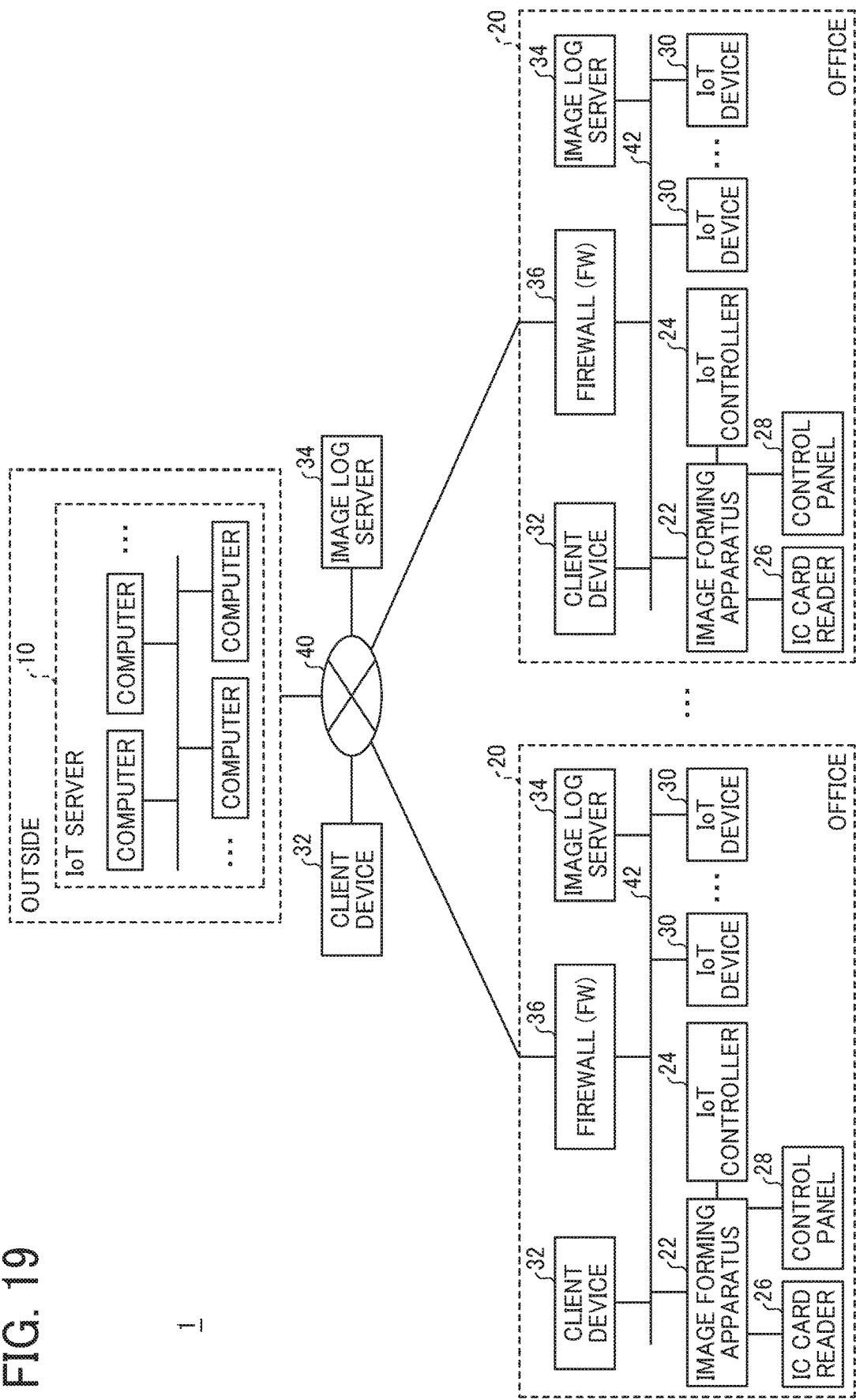
FIG. 19 is a schematic block diagram illustrating another example configuration of the information processing system according to the embodiment.

Further, in this embodiment, operations or functions of the IoT server 10 may be distributed over a plurality of computers, as illustrated in FIG. 19. FIG. 19 is a schematic block diagram illustrating other example configuration of the information processing system 1 according to the embodiment. In FIG. 19, a plurality of computers operate in cooperation with each other to together function as the IoT server 10 at a site external (outside) to the local site (office).

Further, a part of the above-described functions provided by the IoT server 10 may be provided by any other server. Further, the IoT devices 30 provided in the same office illustrated in FIG. 1 are merely an example, and may be provided on the same floor of a building or provided in the same room. That is, the workplace such as the office illustrated in FIG. 1 is merely an example of a user environment in which the IoT devices 30 are provided for operation by the user. The user environment may be any other environment such as a hospital, a factory, a store, an exhibition hall, a school, and a home. Further, while only two sites are illustrated in FIG. 1, any number of sites may be included as a part of the information processing system 1. Further, types of electronic devices provided at each site may vary, depending on characteristics of each site.

Hardware Configuration
<Computer>

Figure 2:
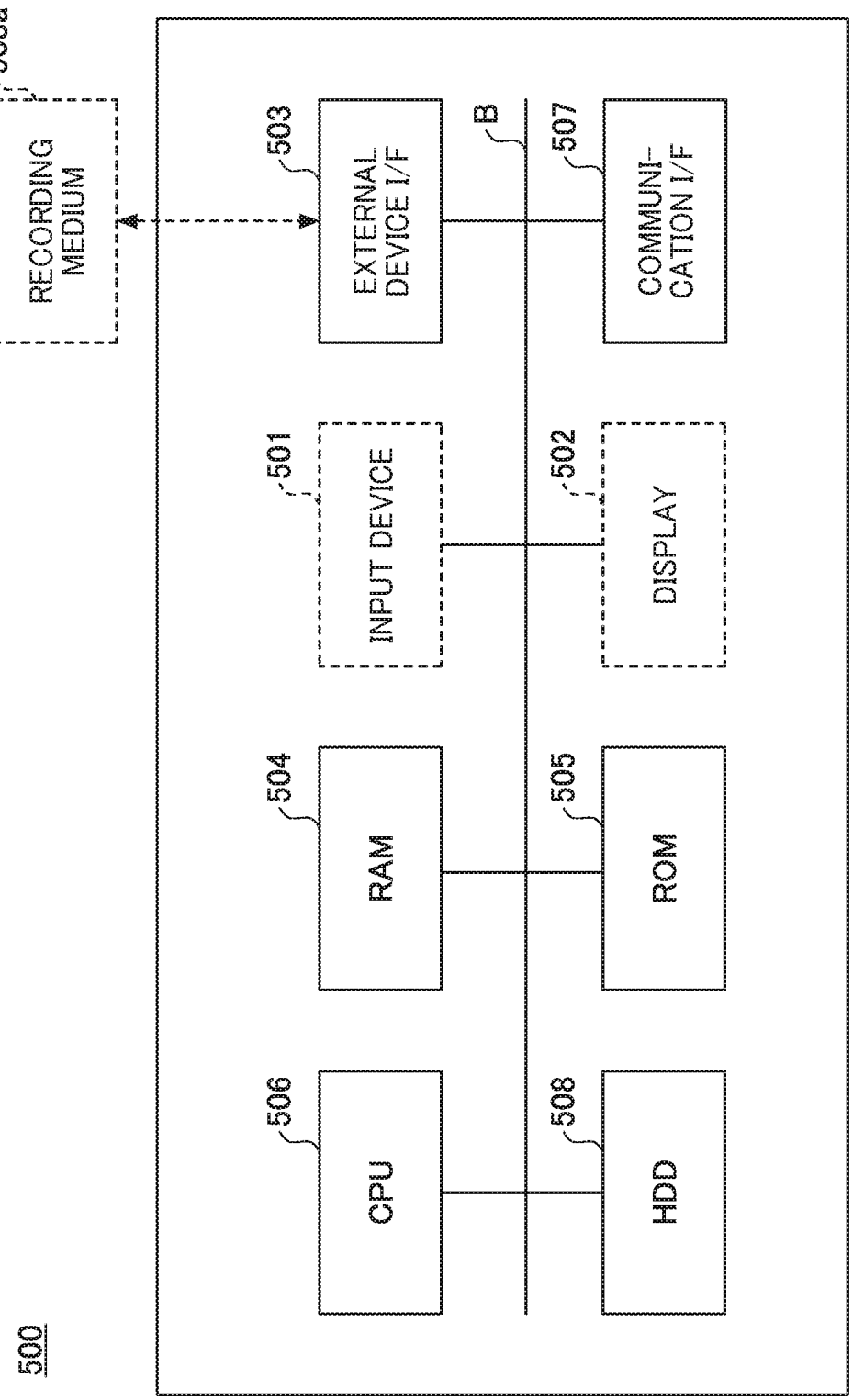
FIG. 2 is a schematic diagram illustrating a hardware configuration of a computer that operates as an IoT server in the information processing system of FIG. 1, according to the embodiment.

The IoT server 10, the control panel 28, the client device 32, and the image log server 34 in FIG. 1 are each implemented by a computer 500 having a hardware configuration as illustrated in FIG. 2, for example. FIG. 2 illustrates a hardware configuration of the computer 500 according to the embodiment.

The computer 500 illustrated in FIG. 2 includes an input device 501, a display 502, an external device I/F 503, a RAM 504, a ROM 505, a CPU 506, a communication I/F 507, and a HDD 508, which are connected with each other through a bus B. The input device 501 and the display 502 may be separate from the computer 500, such that they may be connected to the computer 500 as needed. For example, if the computer 500 operates as the image log server 34, the input device 501 and the display 502 are optional.

The input device 501 is, for example, a keyboard, a mouse, a touch panel, etc., which generates an operation signal according to a user input. The display 502 is any type of display such as a liquid crystal display (LCD), which displays a processing result of the computer 500.

The communication I/F 507 is an interface circuit for connecting the computer 500 to various types of network. With the communication I/F 507, the computer 500 is able to communicate data with another device.

The HDD 508 is an example of a non-volatile memory, which stores programs and data. The programs and data stored in the HDD 508 include, for example, operating system (OS) for controlling entire operation of the computer 500, and application programs for providing various types of function under control of the OS. In alternative to the HDD 508, the computer 500 may use a driver device, such as a solid state drive (SSD), which drives a flash memory as a recording medium.

The external device I/F 503 is an interface circuit that connects the computer 500 with the external device. The external device may be, for example, a recording medium 503a. With the external device I/F 503, the computer 500 is able to write or read onto or from the recording medium 503a. Examples of the recording medium 503a include, but not limited to, a flexible disk, CD, DVD, SD memory card, USB memory, and SIM card.

The ROM 505 is an example of non-volatile memory, which keeps storing programs and data even after the power of the computer 500 is turned off. The programs and data stored in the ROM 505 are, for example, BIOS to be executed upon activation of the computer 500, OS configuration data, and network configuration data. The RAM 504 is an example of a volatile memory, which temporarily stores programs and data.

The CPU 506 is a processor, which controls entire operation or function of the computer 500, to cause the computer 500 to perform processing according to the programs and data read from a memory such as the ROM 505 or the HDD 508. The CPU 506 may be a single processor or multiple processors.

The IoT server 10, the control panel 28, the client device 32, and the image log server 34 may each have a hardware configuration of the computer 500 illustrated in FIG. 2 to perform various processing as described below.

<Image Forming Apparatus>

Figure 3:
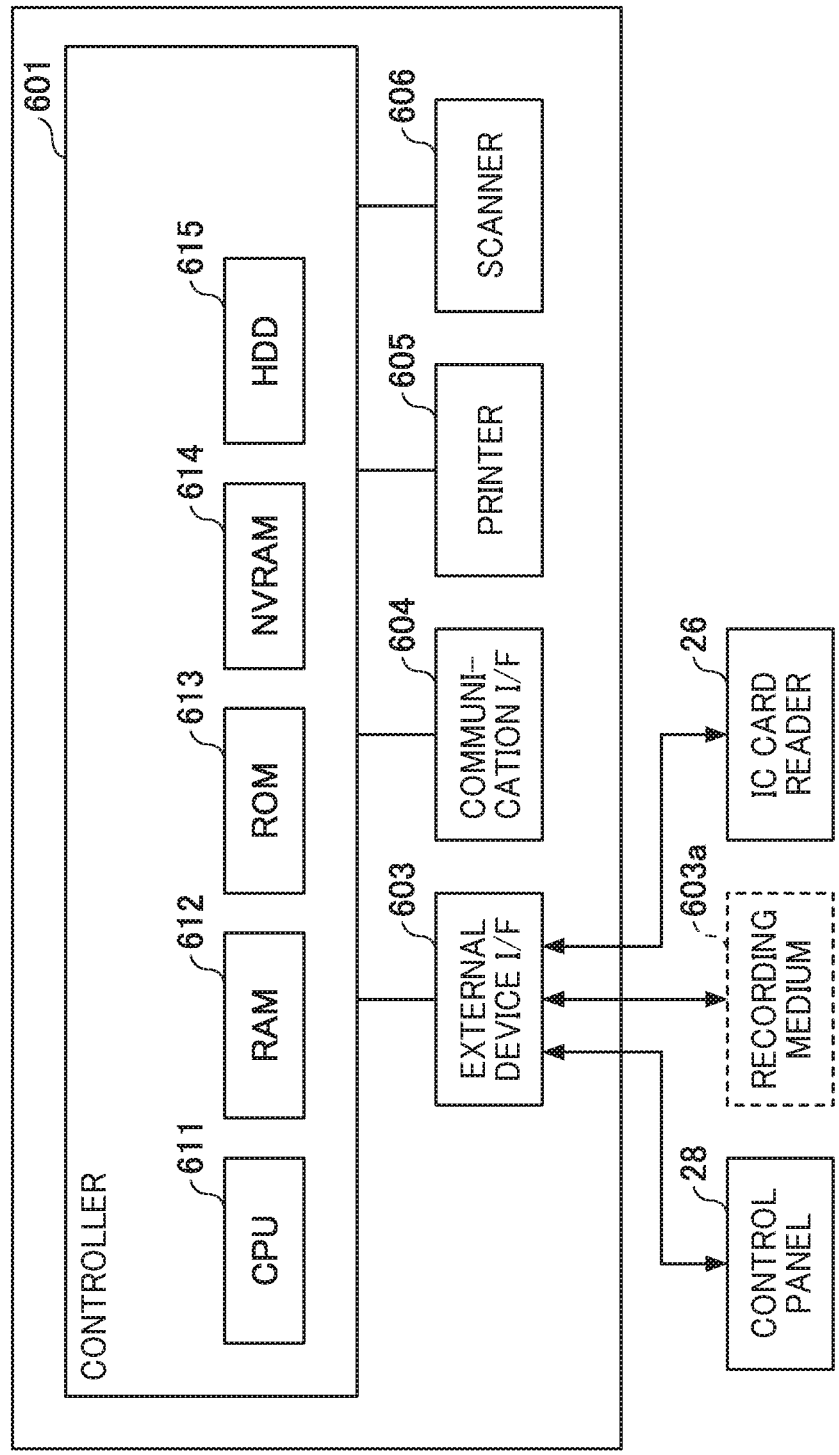
FIG. 3 is a schematic diagram illustrating a hardware configuration of an image forming apparatus in the information processing system of FIG. 1, according to the embodiment.

The image forming apparatus 22 as an example of the electronic device in FIG. 1 has a hardware configuration as illustrated in FIG. 3, when the image forming apparatus 22 is implemented as a multifunction peripheral. FIG. 3 illustrates a hardware configuration of the image forming apparatus 22, according to the embodiment. The image forming apparatus 22 illustrated in FIG. 3 includes a controller 601, an external device I/F 603, a communication I/F 604, a printer 605, and a scanner 606.

The controller 601 includes, for example, a CPU 611, a RAM 612, a ROM 613, a NVRAM 614, and a HDD 615. The ROM 613 stores various types of program and data. The RAM 612 temporarily stores programs and data. The NVRAM 614 stores, for example, configuration data. The HDD 615 stores various types of program and data.

The CPU 611 reads programs, data, setting information, and the like from the ROM 613, the NVRAM 614, the HDD 615 and the like, onto the RAM 612 to execute processing to control entire operation or function of the entire image forming apparatus 22.

The external device interface 603 is an interface circuit that connects the image forming apparatus 22 with an external device. Examples of the external device include, but not limited to, the IoT controller 24 (in case the IoT controller 24 is externally provided), the IC card reader 26, the control panel 28, and a recording medium 603a. The image forming apparatus 22 is able to communicate with, for example, the IoT controller 24, the IC card reader 26, and the control panel 28 via the external device I/F 603. Alternatively, when the IoT controller 24 is incorporated into the image forming apparatus 22, communication with the IoT controller 24 is not performed via the external device I/F 603.

The control panel 28 includes an input section for accepting input from the user and a display section for displaying information to the user.

The image forming apparatus 22 reads or writes from or onto the recording medium 603*a* via the external device I/F 603. Examples of the recording medium 603*a* include, but not limited to, a flexible disk, CD, DVD, SD memory card, USB memory, and SIM card.

The communication I/F 604 is an interface that connects the image forming apparatus 22 to the IoT network 42, and further to the network 40 via the firewall 36. With the communication I/F 604, the image forming apparatus 22 is able to communicate data with another device.

The printer 605 forms an image on a transfer material, such as a transfer sheet, based on print data. Examples of transfer material include, but not limited to, paper, coated paper, thick paper, OHP, plastic film, prepreg, and copper foil. The scanner 606 scans a document into image data (electronic data). FIG. 3 illustrates an example case in which the image forming apparatus 22 is a multifunction peripheral. When the image forming apparatus 22 is not a multifunction peripheral, the printer 605 and the scanner 606 are not necessarily provided. The image forming apparatus 22 may additionally include hardware other than the one illustrated in FIG. 3, such as a camera and a light source for lamp.

<Iot Controller>

Figure 4:
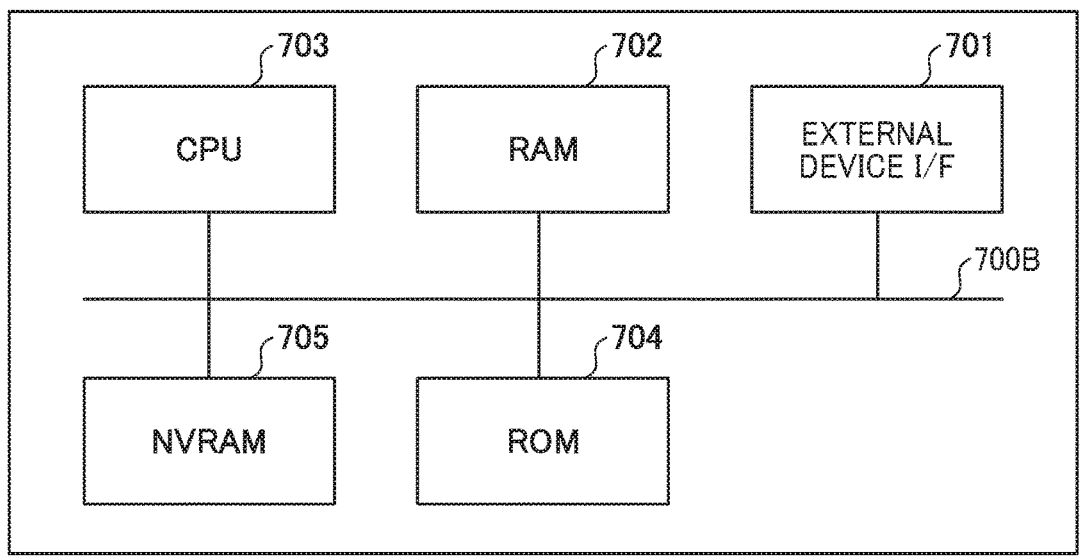
FIG. 4 is a schematic block diagram illustrating a hardware configuration of an IoT controller, according to the embodiment.

The IoT controller 24 as illustrated in FIG. 1 is implemented by a computer having a hardware configuration illustrated in FIG. 4. FIG. 4 illustrates a hardware configuration of the IoT controller 24, according to the embodiment.

The IoT controller 24 illustrated in FIG. 4 includes an external device I/F 701, a RAM 702, a CPU 703, a ROM 704, an NVRAM 705, and the like, which are connected with each other via a bus 700B. The NVRAM 705 is an example of a non-volatile memory, which stores programs and data.

The external device interface (I/F) 701 is an interface circuit that connects the IoT controller 24 with an external device. The external device may be, for example, the image forming apparatus 22 and a recording medium such as the recording medium 603*a*. The external device I/F 701 is communicably connected with the external device I/F 603 of the image forming apparatus 22, such that it enables the IoT controller 24 to communicate with, for example, the IoT server 10 via the image forming apparatus 22 using the communication I/F 604.

The IoT controller 24 reads or writes data from or onto the recording medium such as the flexible disk, the CD, the DVD, the SD memory card, the USB memory, the SIM card, etc. via the external device I/F 701.

The ROM 704 is an example of non-volatile semiconductor memory, which keeps storing programs and data even after the power of the IoT controller 24 is turned off. The ROM 704 stores programs and data to be executed upon activation of the IoT controller 24. The RAM 702 is an example of a volatile semiconductor memory, which temporarily stores programs and data. The CPU 703 is a processor, which controls entire operation or function of the IoT controller 24, to cause the IoT controller 24 to perform processing according to the programs and data read from a memory such as the ROM 704 or the NVRAM 705. The CPU 703 may be a single processor or multiple processors. The IoT controller 24 performs various kinds of processing as described later with the hardware configuration as illustrated in FIG. 4, for example.

As described above, when the software for achieving the function of the IoT controller 24 operates on the image forming apparatus 22 (electronic device), it is not always necessary to provide the hardware configuration as illustrated in FIG. 4. As long as the software operates in cooperation with hardware of the electronic device 22 illustrated in FIG. 2, in a substantially similar manner as the program on the electronic device, operation or function of the IoT controller 24 may be achieved.

In alternative to software, the IoT controller 24 may be implemented as an extension board to be incorporated in the image forming apparatus 22. Such IoT controller 24 may be incorporated in any other type of IoT device 30 to cause the IoT device 30 to cooperate with the IoT controller 24 to perform any one of the operations as described below.

<Software Configuration>

Now, a software configuration of the information processing system 1 according to the present embodiment is described.

<Iot Server>

Figure 5:
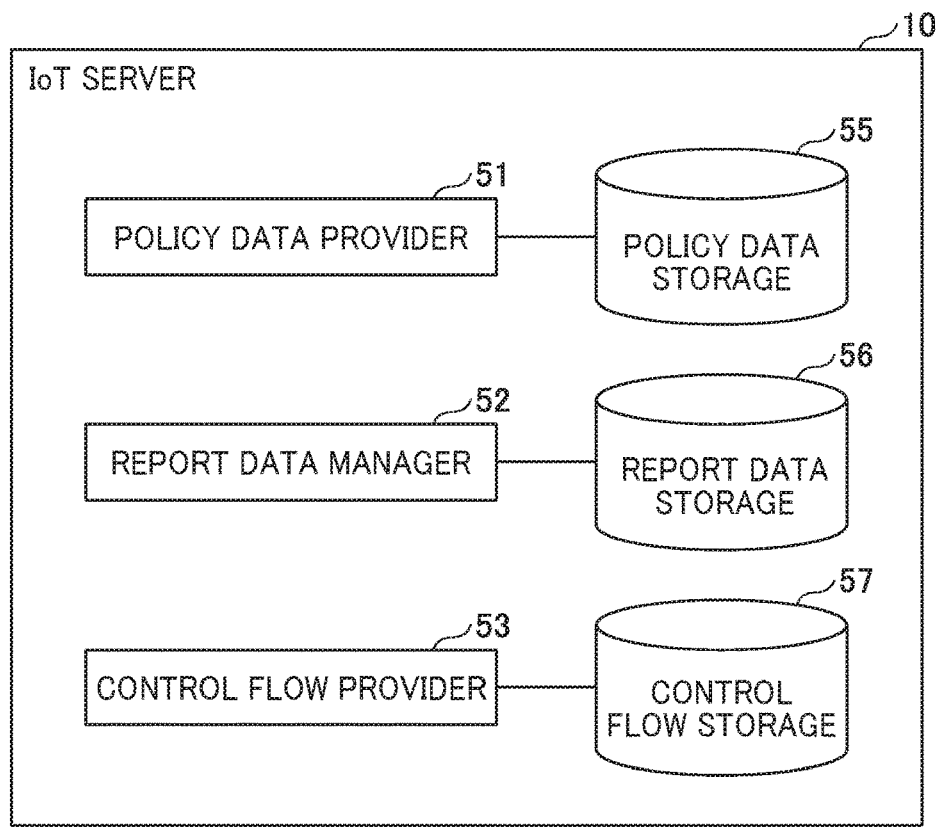
FIG. 5 is a schematic block diagram illustrating a functional configuration of the IoT server, according to the embodiment.

The IoT server 10 includes functional blocks as illustrated in FIG. 5, for example. FIG. 5 is a schematic block diagram illustrating a functional configuration of the IoT server 10 according to the embodiment.

The IoT server 10 in FIG. 5 executes a program to implement, for example, a policy data provider 51, a report data manager 52, a control flow provider 53, a policy data storage 55, a report data storage 56, and a control flow storage 57. Specifically, the policy data provider 51, the report data manager 52, and the control flow provider 53 are each implemented by a set of instructions from the CPU 506. The policy data storage 55, the report data storage 56, and the control flow storage 57 each correspond to a memory such as the RAM 504, ROM 505, etc.

The policy data provider 51 provides policy data to the IoT controller 24. The policy data is stored in the policy data storage 55. The policy data in this example includes an IoT device control policy, a data filter policy, and a report policy, as described below.

The IoT device control policy is used to determine whether or not the user is allowed to execute the control flow selected by the user. The data filter policy is used to determine whether to apply filtering processing to the IoT device data collected from a specific type of IoT device. The report policy is used to determine whether to apply filtering processing to the IoT device data in generating report data from the IoT device data.

The report data manager 52 receives the report data from the IoT controller 24 and stores the received report data in the report data storage 56.

The control flow provider 53 provides the control flow data to the IoT controller 24. The control flow data is stored in the control flow storage 57. The control flow data stored in the control flow storage 57 is, for example, data for collectively controlling the IoT devices 30 within an organization such as a company.

<Control Panel and Image Forming Apparatus>

Figure 6:
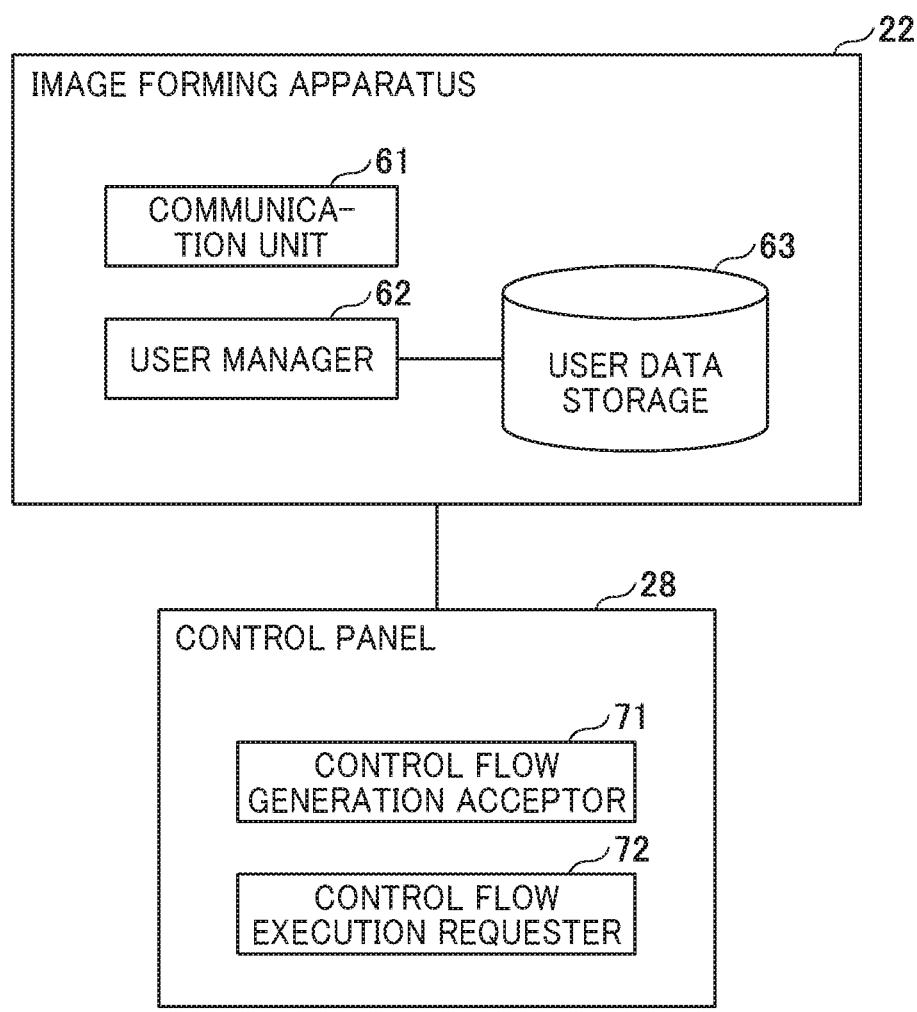
FIG. 6 is a schematic block diagram illustrating a functional configuration of a control panel and the image forming apparatus, according to the embodiment.

The control panel 28 and the image forming apparatus 22 include functional blocks as illustrated in FIG. 6, for example. FIG. 6 is a schematic block diagram illustrating a functional configuration of the control panel 28 and the image forming apparatus 22 according to the embodiment.

The image forming apparatus 22 in FIG. 6 includes a communication unit 61, a user manager 62, and a user data storage 63.

The communication unit 61, which is implemented by the CPU 611 and the external device I/F 603, communicates data with an external apparatus via the IoT network 42. The user manager 62, implemented by the CPU 611, manages user data stored in the user data storage 63. The user data storage 63 is any memory such as the NVRAM 614. For example, the user manager 62 may authenticate a user by using data read by the IC card reader 26 from the user's IC card or the like and the user data stored in the user data storage 63.

The control panel 28 executes programs to implement, for example, a control flow generation acceptor 71 and a control flow execution requester 72. The control flow generation acceptor 71 displays, for example, a control flow generation screen to receive a user instruction for generating a control flow for controlling a specific group of the IoT devices 30, such as the IoT devices 30 in the office. Further, the control flow execution requester 72 requests the IoT controller 24 to execute the control flow selected by the user.

<Iot Controller>

Figure 7:
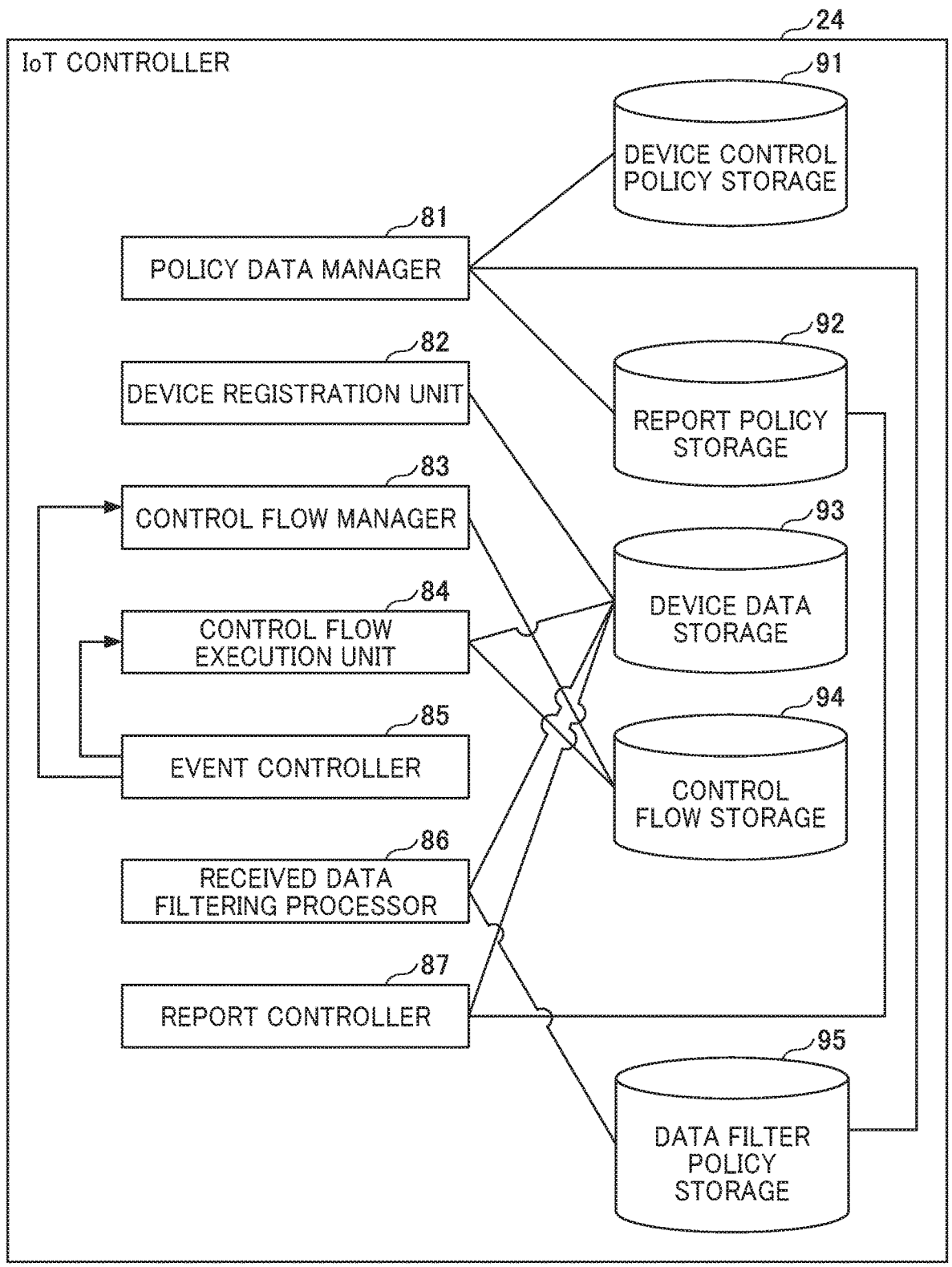
FIG. 7 is a schematic block diagram illustrating a functional configuration of the IoT controller, according to the embodiment.

The IoT controller 24 implements processing blocks as illustrated in FIG. 7, for example. FIG. 7 is a schematic block diagram illustrating a functional configuration of the IoT controller 24 according to the embodiment.

The IoT controller 24 of FIG. 7 executes programs to implement, for example, a policy data manager 81, a device registration unit 82, a control flow manager 83, a control flow execution unit 84, an event controller 85, a received data filtering processor 86, and a report controller 87, according to a set of instructions generated by the CPU 703. The IoT controller 24 further implements a device control policy storage 91, a report policy storage 92, a device data storage 93, a control flow storage 94, and a data filter policy storage 95, using a memory such as the NVRAM 705.

The policy data manager 81 stores, in the device control policy storage 91, information regarding an IoT device control policy included in the policy data provided from the IoT server 10. Further, the policy data manager 81 stores, in the report policy storage 92, information regarding a report policy included in the policy data. Furthermore, the policy data manager 81 stores, in the data filter policy storage 95, information regarding a data filter policy included in the policy data.

As the number of IoT devices 30 to be handled increases, the data size of the policy data increases. In view of this, the policy data manager 81 performs update processing to delete unnecessary policy data, thus saving a memory space. As a method of deleting the policy data, the following method can be considered, for example.

According to a first method, when the IoT controller 24 receives, from the IoT server 10, a notification that certain policy data is unnecessary with information identifying that policy data, the identified policy data is deleted. Before deleting the policy data, the policy data manager 81 may transmit information identifying the policy data to be deleted with the device number of its own device to the IoT server 10 as log information. With such a configuration, the IoT server 10 is able to know that which IoT controller 24 stores which policy data.

According to a second method, each record of policy data is set with an expiration date. The IoT controller 24 determines whether the expiration date has passed or not for each record of policy data, and if it is determined that the expiration date has passed, that record of policy data is deleted. Similarly to the first method, the policy data manager 81 may transmit the log information to the IoT server 10 before deleting the policy data.

In any one of the above-described methods, the policy data manager 81 may determine whether or not the IoT device 30 related to the policy data received from the IoT server 10 is registered in the device data storage 93. If it is determined that the IoT device 30 related to the received policy data is not registered, the policy data manager 81 may notify the IoT server 10 of un-registration of the IoT device 30, and delete the policy data that is received.

With the above-described configuration, when the IoT device 30 is newly registered in the device data storage 93, the policy data manager 81 causes the image forming apparatus 22 to send an inquiry to the IoT server 10 about whether there is any policy data not stored in the memory of the IoT controller 24 but relates to the newly-registered IoT device 30.

When the IoT server 10 determines that such policy data to be stored exists, the IoT server 10 transmits the policy data to be stored to the image forming apparatus 22, to update the policy data stored in the IoT controller 24. The process of newly registering the IoT device 30 will be described later in detail with reference to FIG. 11.

In this example, the device registration unit 82 registers one or more IoT devices 30 located in the same office in the device data storage 93, as the IoT devices 30 belonging to the same group. The device data storage 93 stores the IoT device data, which is information regarding the IoT devices 30 belonging to the same group.

The control flow manager 83 stores, in the control flow storage 94, the control flow data provided from the IoT server 10. Further, the control flow manager 83 stores data of the control flow generated by the user using the control panel 28, for example, as control flow data, in the control flow storage 94. Instead of the control panel 28, the user may use any other device, such as the client device 32, to generate the control flow.

The control flow execution unit 84 performs processing relating to execution of the control flow. If the user who requested execution of the control flow is not prohibited from processing that control flow, the control flow execution unit 84 starts executing the control flow requested by the user. The event controller 85 detects an event, such as a request for executing the control flow from the control panel 28, reception of the IoT device data from the IoT device 30, reading of information from the IC card, etc., and outputs a notification to the control flow manager 83, the control flow execution unit 84, and the received data filtering processor 86.

The received data filtering processor 86 receives the IoT device data from the IoT device 30, and performs filtering on the IoT device data according to the data filter policy stored in the data filter policy storage 95. Then, the received data filtering processor 86 causes the device data storage 93 to store the IoT device data to which the filtering is applied.

The report controller 87 performs filtering on the IoT device data stored in the device data storage 93 in accordance with the report policy stored in the report policy storage 92, to generate report data based on the log data to which filtering is applied. The report controller 87 transmits the generated report data to the IoT server 10.

When communicating with the IoT server 10, the IoT device 30, and the image log server 34 through the communication function of the IoT controller 24 itself, the IoT controller 24 performs communication similar to that of the communication unit 61 of the image forming apparatus 22 in FIG. 6.

<IoT Device>

Figure 8:
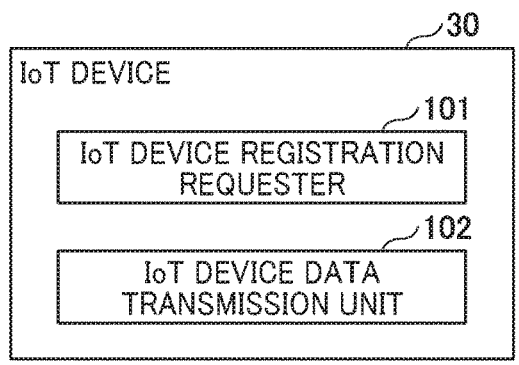
FIG. 8 is a schematic block diagram illustrating a functional configuration of an IoT device, according to the embodiment.

The IoT device 30 implements processing blocks as illustrated in FIG. 8, for example. FIG. 8 is a schematic block diagram illustrating a functional configuration of the IoT device 30 according to the embodiment.

The IoT device 30 of FIG. 8 includes an IoT device registration requester 101 and an IoT device data transmission unit 102, which is implemented by a CPU. The IoT device registration requester 101 sends a request for registering the IoT device 30 of its own to the IoT controller 24. The IoT device data transmission unit 102 transmits the IoT device data of its own to the IoT controller 24 that has registered the IoT device 30.

<Processing>

Referring to FIGS. 9 to 19, operation of collecting IoT device data from the IoT devices 30, and generating report data based on the collected IoT device data for transmission to the IoT server 10, performed by the IoT controller 24, is described according to an embodiment.

<IoT Device Control Processing>

Figure 9:
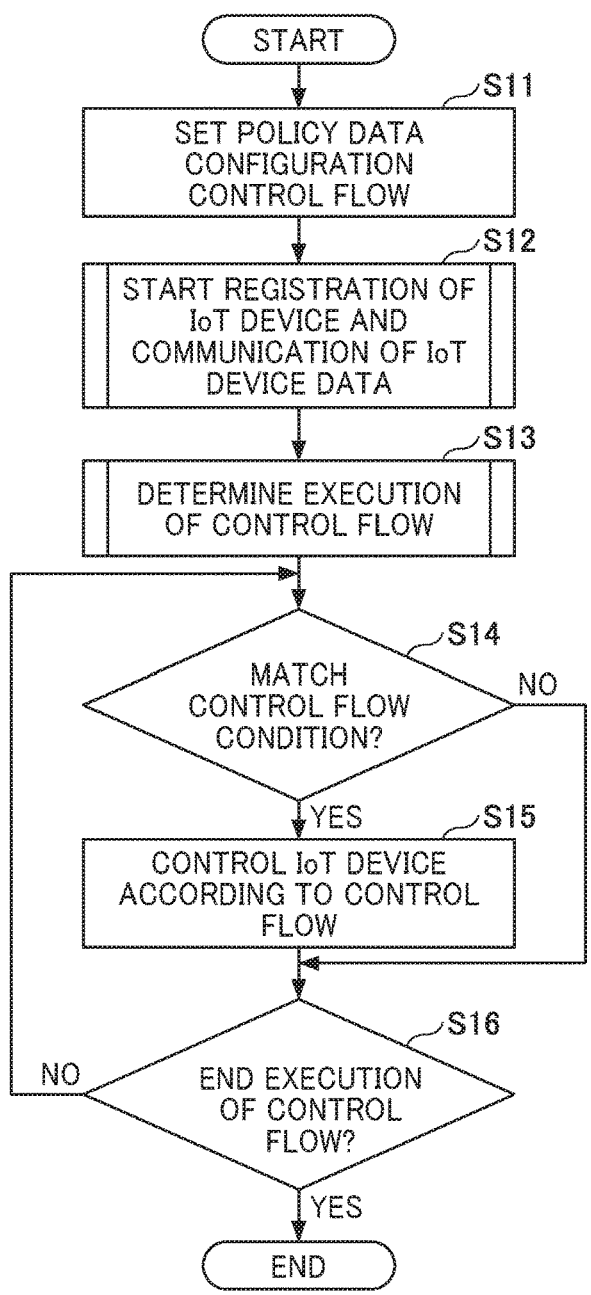
FIG. 9 is a flowchart illustrating operation of controlling IoT devices, performed by the IoT controller, according to the embodiment.

The IoT controller 24 in the information processing system 1 according to the embodiment performs operation of controlling the IoT devices 30, for example, as described referring to FIG. 9. FIG. 9 is a flowchart illustrating an example of IoT device control operation according to the embodiment.

At S11, the policy data manager 81 of the IoT controller 24 accesses the policy data provider 51 of the IoT server 10 to obtain policy data. The policy data manager 81 obtains policy data from the policy data provider 51, using identification information (ID) of an organization that collectively controls operations of the IoT devices 30 subject for management by the organization. For example, the CPU 703 of the IoT controller 24 sends a request, via the image forming apparatus 22, to the IoT server 10 for policy data that is previously prepared for an organization of an interest. The request includes the ID of the organization of an interest. For example, the organization may be a company that owns the office (that is, the site 20 in this example) or a building where the office is located.

In alternative to managing the policy data in association with the identification information (ID) of the organization, the IoT server 10 may manage the policy data of the organization in association with identification information identifying the IoT controller 24. In such case, the IoT server 10 may obtain policy data associated with the identification information of the IoT controller 24 that is received from the IoT controller 24, and causes the policy data provider 51 to provide the obtained policy data to the IoT controller 24. Alternatively, the IoT server 10 may manage the policy data, in association with the identification information (ID) of the organization and the identification information of the IoT controller 24. The IoT server 10 may obtain policy data using identification information (ID) of the organization that is associated with the received identification information of the IoT controller 24, and provides the obtained policy data to the IoT controller 24.

The policy data manager 81 sets the IoT controller 24 with the IoT device control policy, the report policy, and the data filter policy, each included in the received policy data. Specifically, the policy data manager 81 stores the IoT device control policy in the device control policy storage 91, to set the IoT device control policy available for the organization. Similarly, the policy data manager 81 stores the report policy in the report policy storage 92, to set the report policy available for the organization. Similarly, the policy data manager 81 stores the data filter policy in the data filter policy storage 95, to set the data filter policy available for the organization.

Further, the control flow manager 83 of the IoT controller 24 accesses the control flow provider 53 of the IoT server 10 to obtain control flow data. The control flow manager 83 obtains control flow data from the control flow provider 53, using identification information (ID) of an organization that collectively controls operations of the IoT devices 30 subject for management by the organization. For example, the CPU 703 of the IoT controller 24 sends a request, via the image forming apparatus 22, to the IoT server 10 for control flow data that is previously prepared for an organization of an interest. The request includes the ID of the organization of an interest. The control flow manager 83 stores the received control flow data in the control flow storage 94, to set the control flow data.

Similar to the policy data, in alternative to managing the control flow data in association with the identification information (ID) of the organization, the IoT server 10 may manage the control flow data of the organization in association with identification information identifying the IoT controller 24. The IoT server 10 may obtain control flow data associated with the identification information of the IoT controller 24 that is received, and provides the obtained control flow data to the IoT controller 24. Alternatively, the IoT server 10 may manage the control flow data in association with the identification information (ID) of the organization and the identification information of the IoT controller 24. The IoT server 10 may obtain control flow data using the identification information (ID) of the organization that is associated with the received identification information of the IoT controller 24, and provides the obtained control flow data to the IoT controller 24.

Through performing S11, the IoT controller 24 is able to obtain, from the IoT server 10, the policy data and the control flow data, associated with the organization that collectively controls operations of the IoT devices 30, and set the obtained policy data and the control flow data as policy data and control flow data available for use by the user in the organization.

At S12, the device registration unit 82 of the IoT controller 24 searches for one or more IoT devices 30 provided in the same office (that is, the site 20). More specifically, the IoT device registration requester 101 of the IoT device 30 in the same office issues a request for IoT device registration to the device registration unit 82 of the IoT controller 24. In response to the request for IoT device registration, the device registration unit 82 of the IoT controller 24 registers the IoT device 30 that has issued the IoT device registration request, in the device data storage 93 as the IoT device 30 belonging to the same group for management by the IoT controller 24.

The IoT device data transmission unit 102 of the IoT device 30 that has issued the IoT device registration request, further starts transmission of the IoT device data to the IoT controller 24 that has registered the IoT device 30. The received data filtering processor 86 of the IoT controller 24 performs filtering on the IoT device data received from the IoT device 30 in accordance with the data filter policy stored in the data filter policy storage 95, and stores the processed IoT device data in the device data storage 93.

At S13, the control flow execution unit 84 of the IoT controller 24 receives a selection of the control flow to be executed from the user operating the image forming apparatus 22. The control flow execution unit 84 determines, based on the IoT device control policy stored in the device control policy storage 91, whether or not the user who selected the control flow is a user permitted to perform the selected control flow.

For example, if the user who selected the control flow is a user permitted to perform the control flow, the control flow execution unit 84 starts execution of the control flow as illustrated in FIG. 10. FIG. 10 is an illustration of an example structure of control flow data. The control flow in FIG. 10 includes, for each control flow, a control flow name, conditions, and processing, as data items. The control flow name is an example of identification information for identifying the control flow. The processing is various processing to be performed to implement the control flow using the IoT device 30. The conditions are various conditions for determining execution of the control flow.

For example, the control flow data in FIG. 10 is information regarding a control flow for controlling the air conditioner which is an example of the IoT device 30. According to the control flow data of FIG. 10, when the condition "8:00 AM to 20:00 PM on weekdays" and the condition "temperature sensor of 28 degrees C. or higher" are met, the processing of "air conditioner power ON" and the processing of "set temperature to 25 degree C." are performed. Furthermore, according to the control flow data in FIG. 10, when the condition "8:00 AM to 20:00 PM on weekdays" and the condition "temperature sensor of 22 degrees C. or lower" are met, the processing of "air conditioner power ON" and the processing of "set temperature to 25 degree C." are performed. In this example, information regarding the current time is obtained with a timer in the image forming apparatus 22, and information regarding a temperature is obtained by a temperature sensor in the image forming apparatus 22.

As execution of the control flow starts, the control flow execution unit 84 repeats S14 to S16 to detect the control flow that matches the conditions, until an instruction to end execution of the control flow is received from the user. If there is a control flow that matches the conditions, the operation proceeds to S15 to cause the control flow execution unit 84 to control the IoT devices 30 according to the control flow that matches the conditions.

Processing of S12

Figures 11, 12:
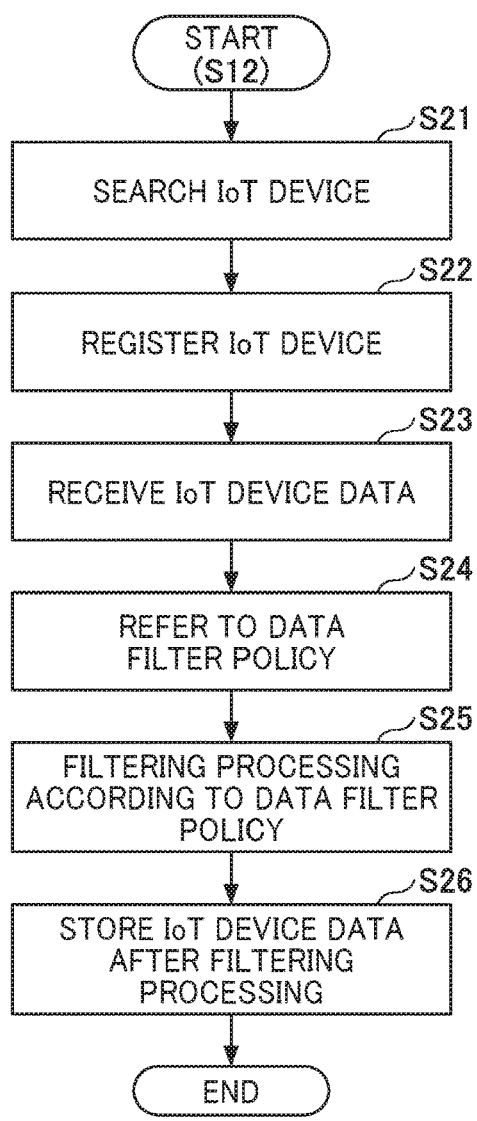
FIG. 11 is a flowchart illustrating processing performed at S12 of the flowchart illustrated in FIG. 9.
FIG. 12 is an illustration of an example structure of a data filter policy.

FIG. 11 is a flowchart of an example of the process of S12. As the operation proceeds to S21, the device registration unit 82 of the IoT controller 24 searches for one or more IoT devices 30 provided in the same office. For example, the device registration unit 82 searches for one or more IoT devices 30 within the office by broadcasting.

At S22, the IoT device registration requester 101 of the searched IoT device 30 (that is, the IoT device 30 that receives the broadcast) issues a request for IoT device registration to the device registration unit 82 of the IoT controller 24. The IoT device registration request includes, for example, the device information of the IoT device 30 and available function (processing) information of the IoT device 30.

The device information of the IoT device 30 includes identification information for identifying the communication destination, which may be used to uniquely identify the IoT device 30. Further, the device information includes address information for specifying the IoT device 30 on a network such as an IP address, which may be used to transmit data to the IoT device 30. Note that the identification information for identifying the communication destination may be address information. The device registration unit 82 of the IoT controller 24 registers the device information and the available function information of the IoT device 30 that has issued the IoT device registration request, in the device data storage 93 as the IoT device 30 belonging to the same group for management by the IoT controller 24.

At S23, the IoT device data transmission unit 102 of the IoT device 30 that has issued the IoT device registration request, starts transmission of the IoT device data to the IoT controller 24 that has registered the IoT device 30. The event controller 85 of the IoT controller 24 starts receiving the IoT device data from the IoT device 30.

In response to reception of the IoT device data from the IoT device 30, the received data filtering processor 86 proceeds to S24 to refer to, for example, the data filter policy stored in the data filter policy storage 95, for example, as illustrated in FIG. 12.

FIG. 12 is an illustration of an example structure of a data filter policy. The data filter policy of FIG. 12 includes an IoT device name and filter ON/OFF setting, as data items. The IoT device name is an example of identification information for identifying the IoT device 30. In this example, the filter ON/OFF setting indicates whether or not to store the IoT device data, received from the IoT device 30 identified with the IoT device name, in the device data storage 93. That is, the filter ON indicates to apply filtering such that the IoT device data is not stored. The filter OFF indicates not to apply filtering such that the IoT device data is stored.

For example, the data filter policy in FIG. 12 indicates that the filter ON/OFF setting of the IoT device 30 with the IoT device name "air conditioner" is "ON", such that the IoT device data from that IoT device 30 is not stored as such data is filtered out. Further, the data filter policy of FIG. 12 indicates that the filter ON/OFF setting of the IoT device 30 with the IoT device name "electronic whiteboard" is "OFF", such that the IoT device data from that IoT device 30 is stored in the device data storage 93 as such data is not filtered out.

At S25, the received data filtering processor 86 performs filtering on the IoT device data received from the IoT device 30, according to the data filter policy stored in the data filter policy storage 95. In the example of the data filter policy of FIG. 12, the IoT device data other than the IoT device data received from the IoT device 30 with the IoT device name "electronic whiteboard" and "projector" are deleted by filtering.

At S26, after the received data filtering processor 86 performs filtering on the IoT device data received from the IoT device 30 in accordance with the data filter policy, the received data filtering processor 86 stores the processed IoT device data in the device data storage 93. In the example of the data filter policy of FIG. 12, the IoT device data from the IoT device 30 with the IoT device name "electronic whiteboard" is stored in the device data storage 93.

Accordingly, use of the data filter policy allows the IoT device data be selectively stored in the IoT controller 24. As long as the data filter policy is registered in the IoT server 10, the IoT server 10 is able to distribute the data filter policy to one or more IoT controllers 24. In this example, the client device 32 may set the data filter policy according to a user instruction, as described below referring to FIGS. 20 and 21. Additionally or alternatively, the data filter policy may be changed so as to reflect the usage of the report data at the IoT server 10. That is, the IoT server 10 may change the data filter policy as needed according to the desired content of the report data, which is determined by using the technology such as deep learning based on the usage of the report data at the IoT server 10.

For example, assuming that the above-described function of the IoT controller 24 is to be implemented by the image forming apparatus 22, the image forming apparatus 22 may not necessarily have a sufficient memory to store the IoT device data. Even if the image forming apparatus 22 has a sufficient memory, such memory is usually used to operate basic functions of the image forming apparatus 22, such that a memory area that can be reserved for the IoT device data may not be sufficient. Storing all of the IoT device data transmitted from a large number of IoT devices 30 in the memory of the image forming apparatus 22, may thus result in high memory pressure.

In view of this, the IoT controller 24 of the present embodiment reduces overall data size of the IoT device data to be stored, by filtering the IoT device data received from the IoT devices 30 according to the data filter policy transmitted from the IoT server 10. In one example, filtering is performed according to the data filter policy, which is previously set by the user. In another example, filtering is performed according to the data filter policy transmitted from the IoT server 10, which is determined based on content of the report data to be received at the IoT server 10.

Processing of S13

Figure 13:
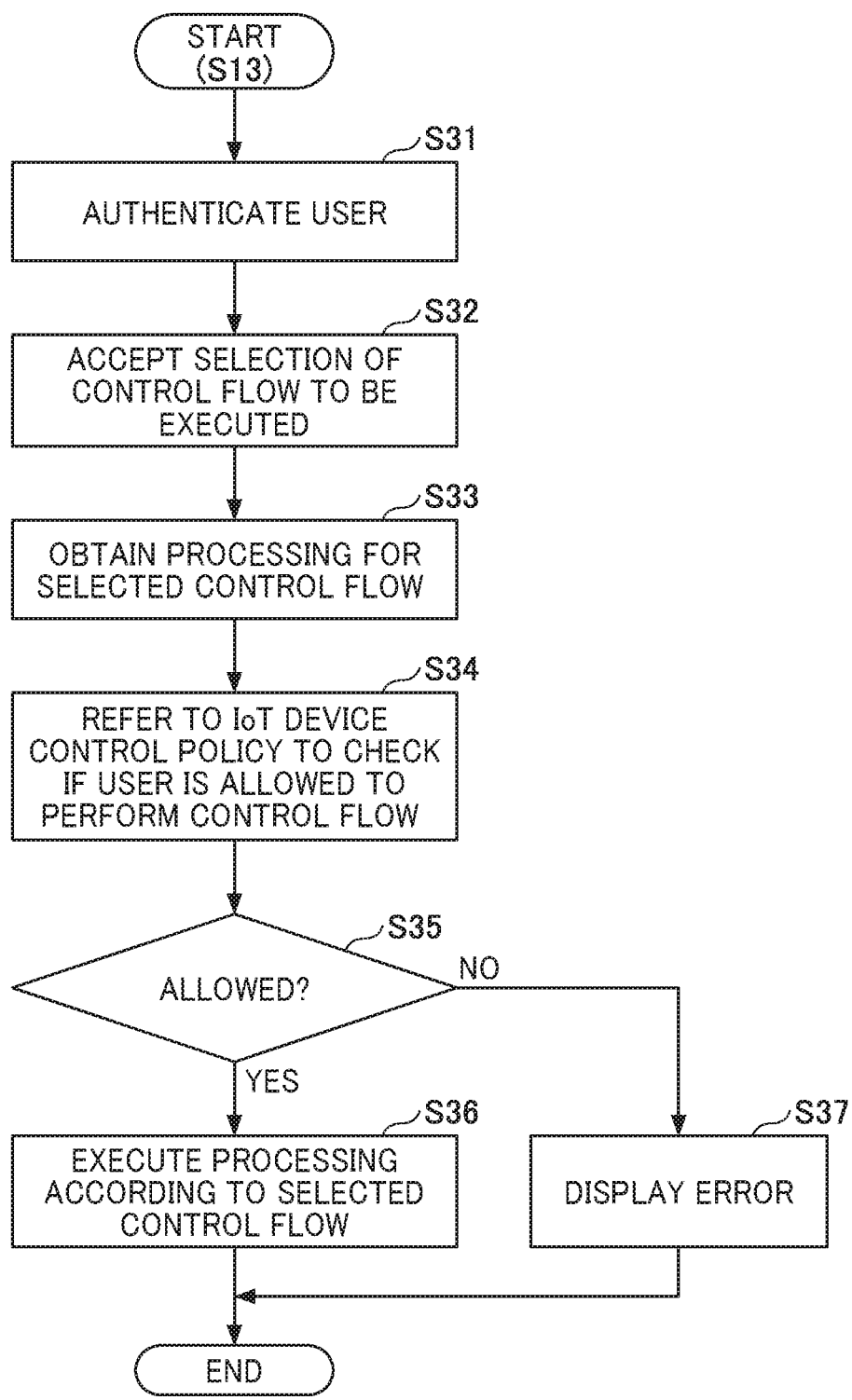
FIG. 13 is a flowchart illustrating processing performed at S13 of the flowchart illustrated in FIG. 9.

FIG. 13 is a flowchart of an example of the process of S13. At S31, the control flow execution unit 84 of the IoT controller 24 authenticates the user operating the control panel 28, and based on authentication, obtains the user information of the user who operates the control panel 28. At S32, the control flow execution unit 84 of the IoT controller 24 receives a selection of the control flow to be executed from the user operating the image forming apparatus 22.

At S33, the control flow execution unit 84 refers to the control flow data of FIG. 10, to extract processing of the control flow selected by the user. The processing of the control flow extracted at S33 is the processing of the IoT device 30 to be performed to implement the control flow selected by the user.

At S34, the control flow execution unit 84 specifies a role of the user, which is indicated by the user information of the user who operates the image forming apparatus 22. Further, the control flow execution unit 84 refers to the IoT device control policy illustrated in FIG. 14, which is stored in the device control policy storage 91, to determine processing that is permitted or prohibited for the user operating the image forming apparatus 22 who has the role as specified by the user information.

Specifically, the control flow execution unit 84 compares between processing that is permitted or prohibited corresponding to the role of the user who operates the image forming apparatus 22, and processing of the IoT device 30 that is necessary to execute the control flow selected by the user. Based on the comparison result, the control flow execution unit 84 determines whether or not the user operating the image forming apparatus 22 is not prohibited from carrying out processing of the IoT device 30 necessary to execute the control flow selected by the user.

More specifically, the control flow execution unit 84 determines, based on the IoT device control policy, whether or not the user who has selected the control flow is a user permitted to perform the selected control flow.

If it is determined that the user is not prohibited from performing the selected control flow, the control flow execution unit 84 proceeds to S36 to start executing the control flow selected by the user at S32. If it is determined that the user is prohibited from performing the selected control flow, the control flow execution unit 84 proceeds to S37, for example, to cause the control panel 28 to display an error message.

That is, if the user who has selected the control flow is a user permitted to perform the selected control flow, the control flow execution unit 84 starts executing the control flow selected by the user. If the user who has selected the control flow is a user prohibited from performing the selected control flow, the control flow execution unit 84 does not start executing the control flow selected by the user.

For example, in the case of the IoT device control policy illustrated in FIG. 14, the user having the role "administrator" is permitted to perform "power ON/OFF" and "temperature setting", each corresponding to processing performed by the "air conditioner" as the IoT device 30. The user having the role "general user" is prohibited from performing both "power ON/OFF" and "temperature setting", each corresponding to processing performed by the "air conditioner" as the IoT device 30.

If the role of the user who selected the control flow of FIG. 10 at S32 is "administrator", the control flow execution unit 84 determines that the user is permitted to perform "power ON/OFF" and "temperature setting", and starts executing the control flow of FIG. 10 (S36).

As the IoT device 30 operates to execute the control flow at S36, the IoT device 30 stores information regarding the control flow that is executed at S36 ("control flow information") and information of the user authenticated at S31 (authenticated user information), which is associated, as log data. For example, examples of such log data of the IoT device 30 is illustrated in FIG. 17A, as described below. Referring to FIG. 17A, the authenticated user information and information relating to the control flow that is executed are stored in association. This log data is used for generating report data, which may be subject to filtering according to the report policy, as described below referring to FIG. 15.

If the role of the user who selected the control flow of FIG. 10 at S32 is "general user", the control flow execution unit 84 determines that the user is prohibited from performing "power ON/OFF" and "temperature setting", and does not start executing the control flow of FIG. 10, but displays an error message (S37). In such case, log data is not stored.

In this embodiment, the IoT controller 24 may cause filtering processing be automatically applied to the IoT device data of the IoT device 30, which has started execution of control flow at S36, according to any one of the data filter policy and the report policy, described below. For example, in the case where the control flow of the air conditioner has executed, the IoT controller 24 may request the IoT server 10 for the data filter policy and the report policy that has been set for the air conditioner, and update the data filter policy and the report policy being stored in a memory with the data filter policy and the report policy that are obtained from the IoT server 10. Alternatively, the IoT controller 24 may allow the user to modify the data filter policy and the report policy, which is obtained from the IoT server 10 automatically with execution of the control flow at the air conditioner.

As described above referring to FIG. 13, the IoT server 10 provides, to the IoT controller 24, the control flow of the IoT devices 30 under control of the organization such as a company, to collectively control the IoT devices 30 in the organization. Further, according to the operation of FIG. 13, the IoT controller 24 is communicably connected to the image forming apparatus 22 provided in each room. This allows an authorized user to select a control flow to be individually executed by a unit of group, such as by office or by room.

For example, in the case where the control of the air conditioner is collectively managed within the company or in the building, in order to monitor the air conditioner of a particular office, the authorized user may select the control flow of the IoT devices 30 provided for that office from among the control flows provided by the IoT server 10. Since the selection is made by the authorized user in the operation of FIG. 13, security is ensured.

Report Data Generation and Transmission

Figure 15:
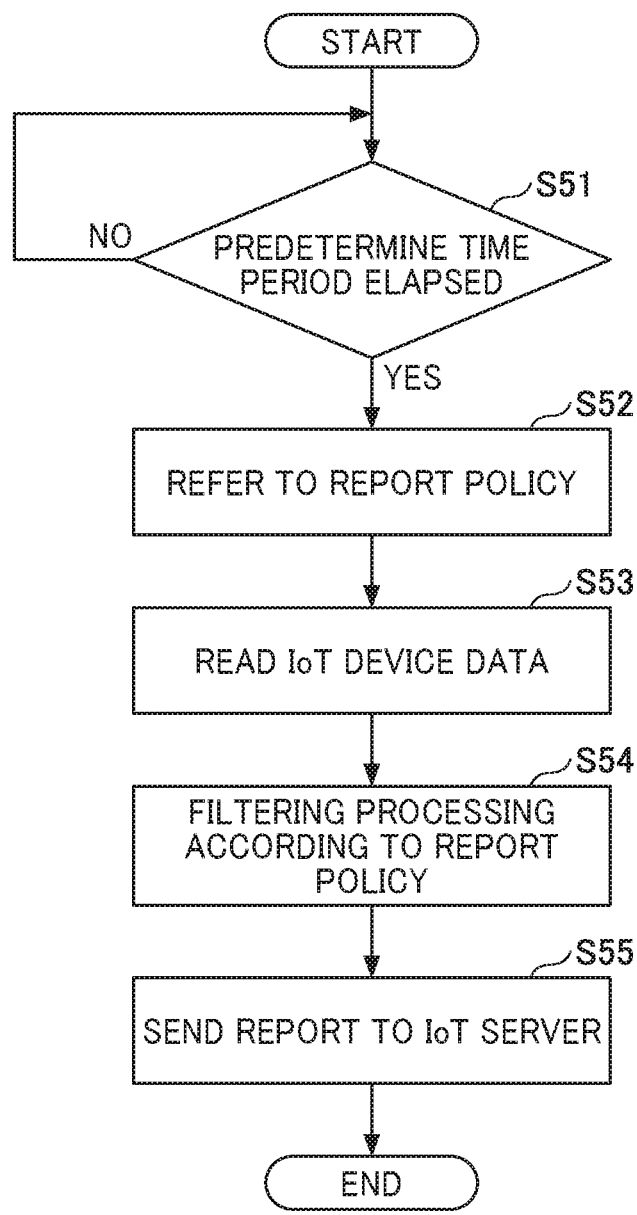
FIG. 15 is a flowchart illustrating operation of transmitting report data, according to an embodiment.

FIG. 15 is a flowchart of an example operation of generating and transmitting the report data. In the report data generation and transmission process, the report controller 87 of the IoT controller 24 generates report data according to the report policy, based on log data that is collected from the IoT device 30, and transmits the generated report data to the IoT server 10. The report data generation and transmission process may be executed at predetermined time intervals, or in response to a request from the IoT server 10. The report generation and transmission process of FIG. 15 is assumed to be executed at predetermined time intervals.

If it is determined that the predetermined time has elapsed ("YES" at S51), the report controller 87 proceeds from S51 to S52 to refer to the report policy stored in the report policy storage 92 as illustrated in FIG. 16, for example.

FIG. 16 is an illustration of an example structure of a report policy. The report policy data illustrated in FIG. 16 includes, for each policy that is set, a policy name, a user, an installation location, an IoT device name, an ID, data to be filtered, and filtering process, as data items. The policy name is an example of identification information for identifying the report policy. The user is identification information identifying the user of the IoT device 30. The installation location is information identifying the location where the IoT device 30 is installed. The IoT device name is an example of identification information for identifying the IoT device 30. The ID is an ID of the IoT device 30 and is an example of identification information for identifying the IoT device 30. The data to be filtered is data to be applied with filtering processing. The filtering process represents a process or a series of processes to be performed on data by filtering.

The information such as the user and installation location of the report policy in FIG. 16 is an example of the attribute information of the device that has executed the process (device operation) as indicated by the log data. Another example of the attribute information includes information indicating a type of the device and information indicating the capability and specification of the device. For example, the "IoT device name (device name)" in FIG. 16 may be information indicating a type of the device.

The report policy data of FIG. 16 may be set with a priority order in case more than one report policy is to be applied to generate a report. In the report policy of FIG. 16, the policy assigned with a lower number (that is, the policy listed at top) has a higher priority, and the policy assigned with a higher number (that is, the policy listed at bottom) has a lower priority. According to the priority order that is previously set, filtering is applied to the log data. The record of the report policy in FIG. 16 indicates specific conditions defined by various types of factors such as the user, the installation location, the IoT device name, and the ID, under which the filtering process is to be performed on the data to be filtered.

The record of the report policy in FIG. 16 indicates specific conditions defined by various types of factors such as the user, the installation location, the IoT device name, and the ID, under which the filtering process is to be performed on the data to be filtered.

Examples of filtering process include, but not limited to, a process of encrypting IoT device data to be filtered, a process of deleting IoT device data from a memory, a process of deleting IoT device data for transmission, and a process of replacing data in the IoT device data such as an image log (image data) with a URI indicating a storage location of such data. The process of deleting data from the IoT device data to be transmitted is applied, for example, to the IoT device data of the IoT device 30, which is notified from the IoT server 10 as not useful in terms of generating report data.

Referring back to FIG. 15, at S53, the report controller 87 sequentially reads the IoT device data to be transmitted, from the device data storage 93. At S54, the report controller 87 selects a record of the report policy corresponding to the read IoT device data that satisfies the conditions, and executes the filtering process on the data to be filtered in that record.

For example, in the case of the report policy illustrated in FIG. 16, operation data (including stroke data) is encrypted by filtering processing, which is obtained from the IoT device data transmitted from the IoT device 30 having the IoT device name "electronic whiteboard" used by the user "AAA" who is a president. That is, the IoT device data of the IoT device 30 used by a specific user can be encrypted by filtering processing in generating the report.

Still referring to the report policy of FIG. 16, operation data (including stroked data) of the IoT device data transmitted from the IoT device 30 having the IoT device name "electronic whiteboard" whose installation location is the "president's room" is deleted by filtering processing. That is, the IoT device data of the IoT device 30 installed in a specific location can be deleted by filtering processing in generating the report.

In FIG. 16, the operation data including stroke data of strokes drawn on the electronic whiteboard, and the image log, are taken as examples of the IoT device data subjected to filtering processing. Other examples of the IoT device data subjected to filtering processing include, but not limited to, log data indicating a log of device settings of the IoT device 30 that have been changed over a time, log data indicating a log of devices that have been connected to the IoT device 30, and log data associating information relating to the control flow that has been executed at S36 of FIG. 13 with the user information. As described above referring to FIG. 17A, the information relating to the control flow is associated with the user information of the user who has instructed to execute the control flow. The name of the IoT device 30, which is previously set as an entity to which a policy is applied (See FIGS. 20 and 21), may be an identifier identifying the IoT controller 24 or an identifier identifying the image forming apparatus 22 connected to or incorporating the IoT controller 24.

The report controller 87 generates report data based on the IoT device data, having been applied with filtering according to the report policy. At S55, the report controller 87 transmits the generated report data to the IoT server 10.

FIGS. 17A and 17B are an illustration of an example of the filtering process performed according to the report policy of FIG. 16. FIG. 17A specifically illustrates the IoT device data of the IoT device 30 having the IoT device name "electronic whiteboard" used by the user "AAA" who is the president. The IoT device data in FIG. 17A includes an operation of turning on the power, two stroke operations, and an operation of turning off the power.

Referring to FIG. 17A, the IoT device data reflecting the two stroke operations is selected for filtering processing, as a record that matches the report policy listed at top of FIG. 16 ("policy 1"). The report controller 87 encrypts operation data (including stroke data), which is data to be filtered in the selected record, by filtering processing. Still referring to FIG. 17A, the IoT device data reflecting the power on and power off operations is not selected for filtering processing, according to the report policy of FIG. 16. Accordingly, the IoT device data of FIG. 17A results in the IoT device data of FIG. 17B after the filtering process is applied to generate the report. FIG. 17B illustrates the log data, which is the IoT device data having been applied with filtering processing, for transmission to the IoT server 10. In this example, instead of transmitting the log data of FIG. 17B as it is, the log data may be transmitted to the IoT server 10 after being converted into a data format compatible with the IoT server 10.

As described above referring to FIGS. 16, 17A, and 17B, the log data of the electronic whiteboard, as an example of IoT device data of the IoT device 30, is transmitted to the IoT server 10, after being applied with filtering processing to encrypt stroke data, according to the report policy that is previously set by the user for a specific unit of organization.

In the example report policy data illustrated in FIG. 16, the user item indicates a specific user "AAA", with an identifier for identifying the user. Alternatively, the user item may include information regarding the attributes of the user, such as a management authority of the user or a position of the user in a company. For example, the IoT controller 24 may send an inquiry to the external server that manages user information to request for attribute information of the user that is identified with the log data. The external server stores user identification information and user attribute information in association with each other. The IoT controller 24 sends the user identification information obtained from the log data, to the external server to obtain attribute information of the user. Once the attribute information of the user is obtained, the IoT controller 24 may store such information as cache data. In this way, the IoT controller 24 does not have to ask for attribute information for every user.

FIGS. 18A and 18B are an illustration of another example of the filtering process performed according to the report policy of FIG. 16. FIG. 18A specifically illustrates the IoT device data of the IoT device 30 having the IoT device name "electronic whiteboard", located in the "president room". The IoT device data in FIG. 18A includes an operation of turning on the power, two stroke operations, and an operation of turning off the power.

Referring to FIG. 18A, the IoT device reflecting the two stroke operations is selected, as a record that matches the report policy listed second from the top of FIG. 16 ("policy 2"). The report controller 87 deletes operation data (including stroke data), which is data to be filtered in the selected record, by filtering processing. Still referring to FIG. 18A, the IoT device data reflecting the power on and power off operation is not selected, according to the report policy of FIG. 16.

Accordingly, the IoT device data of FIG. 18A results in the IoT device data of FIG. 18B after the filtering process is applied to generate the report. FIG. 18B illustrates the log data, which is the IoT device data having been applied with filtering processing, for transmission to the IoT server 10. In this example, instead of transmitting the log data of FIG. 18B as it is, the log data may be transmitted to the IoT server 10 after being converted into a data format compatible with the IoT server 10. Further, in this example, the "device name" in FIG. 16, 17A, 17B, 18A, or 18B is not always a name assigned to the individual IoT device 30, but may be information indicating the type of the IoT device 30.

Through performing the process of FIG. 15, the report is generated based on the IoT device data of the IoT device 30, which is associated with a specific user or a specific location (or both), after applying filtering processing to the IoT device data that has been collected from the IoT devices 30. Examples of filtering processing to be applied to such IoT device data include, but not limited to, encryption of data, deletion data from a memory, deletion data before transmission, and processing to replace image data (image log) with a URI.

Through applying filtering processing to the IoT device data when generating the report, the IoT device data of the IoT device 30 related to a specific user or a specific location may be protected, for example, in a substantially similar manner as protecting personal information or charge information that should be confidential.

According to one or more embodiments described above, for transmission of the report data on the log data of the IoT devices 30 at the site 20 to the IoT server 10, the IoT controller 24 refers to the policy, which associates the conditions for applying the filtering process with a type of the log data to be filtered, to perform filtering. For example, as described above referring to FIG. 16, the conditions may be determined based on attribute information of the IoT device 30 such as a user operating the IoT device 30 or a location where the IoT device 30 is installed. Accordingly, the log data may be processed while taking into account various factors that differ among individual organizations or users, including, for example, how to operate the IoT device 30, the organization to which the user belongs, and how to utilize the log data.

More specifically, according to one or more embodiments described above, the user who has an access to the IoT server 10 can generate, modify, or select a report policy and a data filter policy to be applied to a desired unit of organization (such as the site 20). The IoT controller 24 at each site 20 obtains the report policy and data filter policy to be applied to the site 20. The IoT controller 24, at the site 20, generates report data based on the IoT device data received from the IoT devices 30 in the site 20, by applying filtering processing to the collected IoT device data according to the report policy and the data filter policy that is obtained for the site 20. Accordingly, the report is generated for each organization, or each unit of organization, in a manner that the report contains the log data that has been applied with filtering processing that is determined by the report policy and the data filter policy that has been set for each organization, or each unit of organization.

Figure 20:
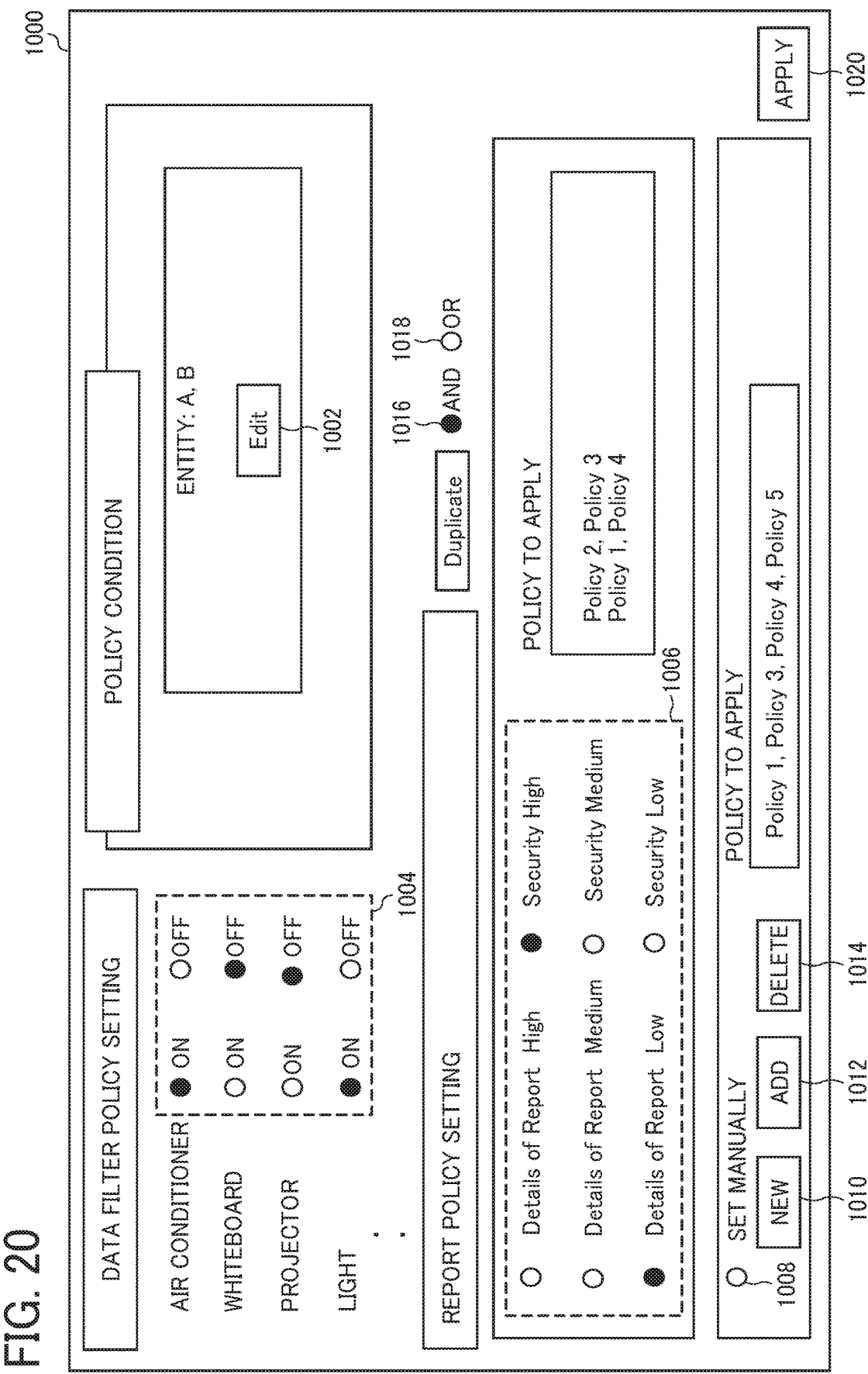
FIG. 20 is an illustration of an example policy configuration screen.
Figure 21:
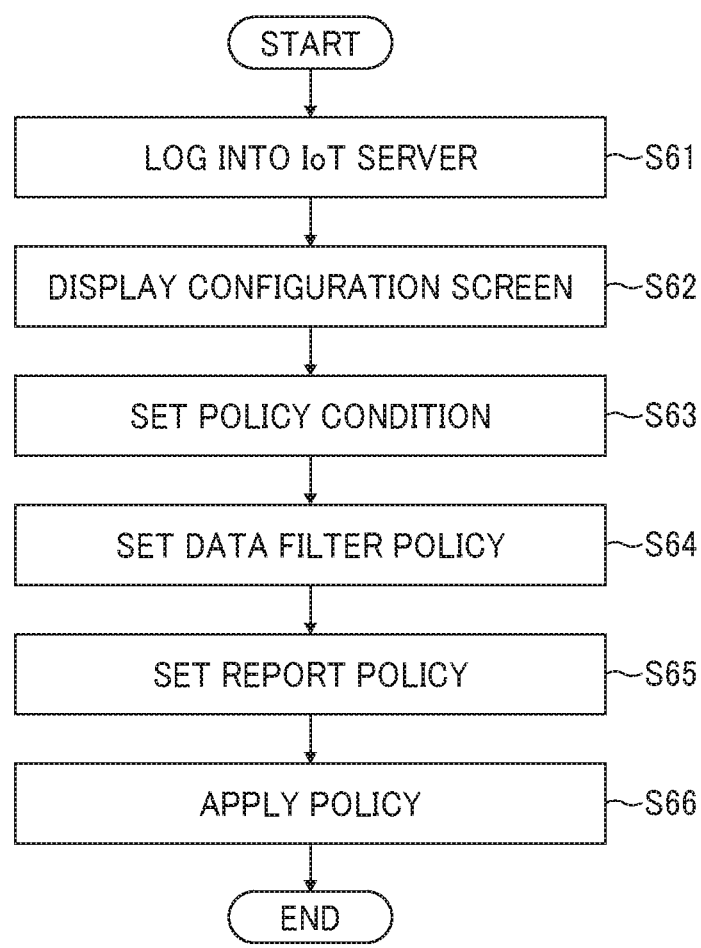
FIG. 21 is a flowchart illustrating operation of setting policy data, performed by the client device, according to an embodiment.

Referring now to FIGS. 20 and 21, operation of generating or setting the report policy and the data filter policy is described according to an embodiment.

In this embodiment, the user generates or configures the report policy and the data filter policy through a policy configuration screen 1000 as illustrated in FIG. 20. The information processing system 1 according to the embodiment sets various types of policy data through performing operation as described below referring to FIG. 21. FIG. 21 is a flowchart illustrating operation of setting policy data, performed by the client device 32 in the site 20, that communicates with the IoT server 10, according to the embodiment.

At S61, in response to a user instruction for setting a policy, the client device 32 allows the user to log into the IoT server 10 through the network 40. For example, the client device 32 sends authentication information of the user, such as a user ID and a password, to the IoT server 10 to request for login. The IoT server 10 determines whether the user is a legitimate user using the authentication information that is received.

At S62, based on a determination that the user is successfully logged in, the IoT server 10 sends data of the policy configuration screen 1000 for display. Based on the received data, the client device 32 controls the display 502 to display the policy configuration screen 1000 as illustrated in FIG. 20.

If the user has already logged into the IoT server 10, S61 of logging in may be skipped.

Using the policy configuration screen 1000, the user sets one or more policies to be applied to IoT device data (log data) of the information processing system 1.

At S63, the client device 32 sets a condition for applying a policy to be generated or configured ("policy condition"). Example items of such policy condition include, but not limited to, an item identifying an entity to which a policy is applied. For example, the user selects the "Edit" button 1002, shown in the "entity" section of the configuration screen of FIG. 20, to enter or edit (add or delete) an entity to which a policy, such as a data filter policy or a report policy, is applied. In the example illustrated in FIG. 20, the organization A and the organization B are set as an entity to which a policy to be generated or configured is applied. The user may delete or add any organization, from a list of entities to which a policy is applied. In one example, the IoT server 10 previously stores in its memory information indicating one or more organizations that can be set as an entity to which a certain policy is applied. Alternatively, the IoT server 10 may obtain such information regarding the organizations from any external server. While the name of an organization is displayed in the example of FIG. 20, any other identifier, such as an identification number of an organization, may be displayed. In such case, the name of the organization may be associated with the identification number. The identifier of the organization is later used by the IoT server 10, when the identifier of the organization is received from the IoT controller 24 at S11 of FIG. 9.

At S64, the client device 32 sets a data filter policy. The data filter policy indicates whether or not to apply filtering on the IoT device data, which is obtained from the IoT device 30 as a result of performing operations according to the control flow. As illustrated in FIG. 20, the configuration screen 1000 has a data filter policy setting section, which allows the user to set a data filter policy for each one of the IoT devices 30 that are available. More specifically, the user can select the "ON" radio button 1004 or "OFF" radio button 1004 to set to apply or not to apply a data filter policy for each one of the IoT devices 30. The setting of data filter policy is stored, as a part of data filter policy as described above referring to FIG. 12. In this specific example, it is assumed that the filtering is "OFF" for the electronic whiteboard, the projector, and the MFP, such that the IoT device data (log data) is collected from the electronic whiteboard, the projector, and the MFP.

At S65, the client device 32 sets a report policy. As illustrated in FIG. 20, the policy configuration screen 1000 includes a report policy setting section, which allows the user to set a report policy. In one example, the user is able to select how detail the report should be (detailedness), and/or a level of security to be applied to the content of the report (security level), to set one or more report policies that are previously determined by the detailedness and the selected security level. For example, a plurality of report policies is previously set, each having a specific level of detailedness (high, medium, or low) and/or a specific security level (high, medium, or low). According to selection of either or both of a specific level of detailedness and a specific security level, the IoT server 10 is able to determine at least one of the report policies. The names of report policies that are determined may be displayed in a "policy to apply" section shown in the middle of FIG. 20.

In selecting the policy by the detailedness and/or the security level, the user selects a specific radio button for a desired detailedness and/or a specific radio button for a desired security level, from a group of radio buttons 1006.

In this embodiment, the detailedness of the report indicates detailedness of the report to be transmitted from the IoT controller 24 to the IoT server 10. With the high detailedness, the report contains log data with more information, while applying a report policy that filters none or little information. With the low detailedness, the report contains log data with less information, while applying a report policy that filters out more information. In this embodiment, one or more report policies that are available for use are previously stored in the memory of the IoT server 10 in association with the level of the detailedness.

Assuming that there are four policies that are available as illustrated in FIG. 16, the low level of detailedness is associated with the report policy 2 and the report policy 3. That is, the report policy 2 for deleting the IoT device data from a memory, and the report policy 3 for deleting the IoT device data before transmission are applied to the log data, when the low level of detailedness is selected. The high level of detailedness is associated with the report policy 2, but not associated with the report policy 3. That is, the report policy 2 is applied to the log data, when the high level of detailedness is selected. Since more filtering is applied according to the report policy in case the low level of detailedness is selected, the resultant report contains less information. Referring to FIG. 20, in response to selection of the "low" detailedness, the names of the report policy 2 and the report policy 3 are displayed in the "policy to apply" section shown in the middle of FIG. 20.

Further, in this embodiment, the security level of the report indicates a level of security required for the IoT device data (log data) to be transmitted, which is determined based on confidentiality of the IoT device data. With the high security level, filtering processing is applied to the IoT device data to be reported, to improve the security level of the IoT device data such as by encrypting. With the low security level, filtering processing is applied to the IoT device data to be reported, to keep the security level of the IoT device data low compared to the case when the high security level is selected, such as by not encrypting. In this embodiment, one or more report policies that are available for use are previously stored in the memory of the IoT server 10 in association with the security level.

In the example case of having the four policies as described above referring to FIG. 16, the high security level is associated with the report policy 1 and the report policy 4. That is, the report policy 1 for encrypting the IoT device data, and the report policy 4 for replacing the image log (the image data) with an address are applied, when the high level of security is selected. Referring to FIG. 20, in response to selection of the "high" security level, the names of the report policy 1 and the report policy 4 are displayed in the "policy to apply" section shown in the middle of FIG. 20. Here, none of the report policies is associated with the low security level. Since more filtering is applied according to the report policy in case the high level of security is selected, the resultant report contains data with improved security level.

In alternative to selecting the report policy according to the detailedness and/or security level, the user is able to select any one of a plurality of policies that are available including, for example, the policies that are previously provided by the service provider, and the policies that are previously generated by the user.

More specifically, in the policy configuration screen 1000 of FIG. 20, the user selects a "set manually" radio button 1008 in a "policy to apply" section at the bottom of FIG. 20. To newly generate the policy, the user selects a "New" button 1010. In response to selection of the "New" button 1010, the client device 32 switches the display 502 to display a screen for allowing the user to input various types of information as illustrated in FIG. 16, such as the name of the report policy, the user, the installation location (place), and the IoT device name. The client device 32 generates the new policy based on information input by the user, and displays the name of the new policy (for example, the report policy 5 in FIG. 20), in the "policy to apply" section at the bottom of FIG. 20.

To add the policy, the user selects an "Add" button 1012. In response to selection of the "Add" button 1012, the client device 32 allows the user to select one or more report policies from a list of report policies that are previously prepared, to be added as a report policy to be applied. The names of the selected report policies are displayed in the "policy to apply" section at the bottom of FIG. 20.

In response to selection of the "Delete" button 1014, the client device 32 allows the user to select one or more report policies being displayed in the "policy to apply" section at the bottom of FIG. 20, to delete from the report policy to be applied.

The policy configuration screen 1000 of FIG. 20 further allows the user to set which one of a plurality of report policies is to be applied to the IoT device data, when the IoT device data is subject to filtering processing according to more than one report policy. When the "AND" radio button 1016 is selected, the IoT device data that has met a certain policy condition is sequentially applied with filtering processing according to all of the report policies one by one. For example, in the example case illustrated in FIG. 16, the operation data is subject to filtering processing according to the report policy 1, and the processed operation data is subject to filtering processing according to the report policy 2. More specifically, the filtering processing to "encrypt" according to the report policy 1 is applied to the operation data, and the filtering processing to "delete" according to the report policy is applied to the encrypted operation data. If the filtering processing to "delete" is applied to the operation data according to the report policy 2 first, the filtering processing to "encrypt" is not applied as there is no operation data.

When the "OR" radio button 1018 is selected, the IoT device data that has met a certain policy condition is applied with filtering processing according to each one of the report policies. For example, in the example case illustrated in FIG. 16, the operation data is subject to filtering processing according to the report policy 1 and filtering processing according to the report policy 2, with each filtering processing being performed separately. Specifically, the filtering processing to "encrypt" according to the report policy 1 is applied to the operation data. Similarly, the filtering processing to "delete" according to the report policy 2 is applied to the same operation data. Accordingly, even if the filtering processing to "delete" is applied to the operation data first, the filtering processing to "encrypt" is applied to the operation data such that the encrypted operation data (log data) is generated. This configuration indicating how the filtering processing is to be performed when the same IoT device data is subject to filtering processing according to more than one report policy (referred to as "duplicate"), is included in the policy data to be transmitted from the IoT server 10 to the IoT controller 24 at S11 of FIG. 9.

Further, when more than one report policy is to be applied, the order of applying filtering according to the report policy may be determined according to an priority order that is previously determined as described above referring to FIG. 16. For example, when the report policy 1 and the report policy 2 are to be applied in this order, filtering according to the report policy 1 is applied first, and filtering according to the report policy 2 is applied next.

Referring back to FIG. 21, at S66, in response to selection of the "Apply" button 1020 of the policy configuration screen 1000 of FIG. 20, the client device 32 accepts settings entered at S63, S64, and S65, respectively. Specifically, the client device 32 transmits information regarding accepted settings of the data filter policy and the report policy to the IoT server 10, with information regarding the policy condition. The IoT server 10 stores information regarding settings of the policies (that is, the data filter policy and the report policy) in association with identification information of one or more organizations that has been selected as an entity to which a policy is applied. As described above referring to FIG. 9, the IoT server 10 transmits information regarding the policies, as policy data, to the IoT controller 24, in response to reception of identification information of an organization.

In this example illustrated in FIG. 20, when the user selects a specific policy name being displayed in the "policy to apply" section, the client device 32 causes the display 502 to display settings of the selected policy (data items such as the user and the installation location as described above referring to FIG. 16), thus allowing the user to check the settings.

While the user selects a specific radio button to set the policy in the example illustrated in FIG. 20, the user may configure settings of the policy using any other method. Further, in alternative to displaying the policy configuration screen 1000 at the client device 32, the IoT controller 24 may control the control panel 28 via the information processing apparatus 22 to display thereon the policy configuration screen 1000 of FIG. 20. In such case, the user controls the control panel 28 to enter or update settings information on the policy configuration screen 1000.

In the above-described example, it is assumed that the client device 32 accesses the IoT server 10 to allow the user to set the policy. Alternatively, the client device 32 may access the IoT controller 24 through the network 42 to display the policy configuration screen 1000 of FIG. 20, to set or update the policy data stored in a memory of the IoT controller 24. In such case, the IoT controller 24 does not have to obtain the policy data from the IoT server 10 for display. However, once the policy is set or updated, the IoT controller 24 transmits information regarding settings of the policy to the IoT server 10, to update the policy data stored in the IoT server 10.

In one or more embodiments described above, the log data that is generated through execution of the control flow is collected from the IoT device 30. However, any other IoT device data, such as log data, that can be collected from the IoT device 30 may be subject to transmission to the IoT server 10.

Figure 22:
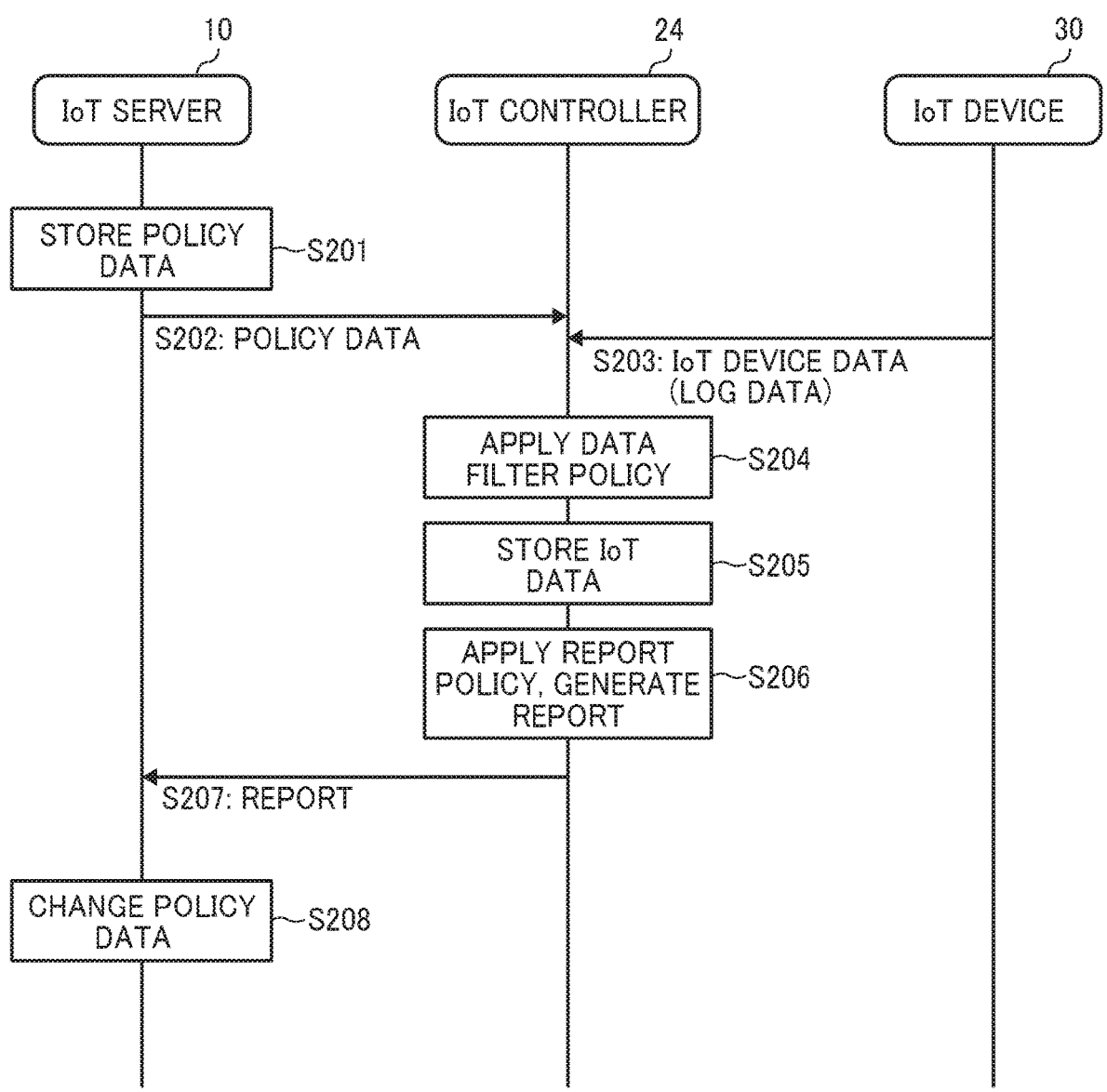
FIG. 22 is a data sequence diagram illustrating operation of applying filtering processing to IoT device data, and transmitting report data, performed by the IoT controller in cooperation with the IoT server, according to an embodiment.

Referring now to FIG. 22, operation of applying filtering processing to IoT device data, and transmitting report data based on the IoT device data, is described according to an embodiment. The operation of FIG. 22 is performed by the IoT controller 24, in cooperation with the IoT server 10 and the IoT device 30.

At S201, the IoT server 10 stores policy data including a data filter policy and a report policy in a memory. As described above referring to FIGS. 20 and 21, the IoT server 10 stores in a memory, the policy data, which is previously generated, modified, or selected by the user, in association with identification information identifying a specific organization or a specific unit of organization (that is, an entity to which a policy is applied). S201 may be performed at any time.

In response to reception of identification information identifying the organization (or unit of organization) from the IoT controller 24, at S202, the IoT server 10 sends the policy data associated with the received identification information of the organization, to the IoT controller 24. The IoT controller 24 stores the received policy data in a memory.

At S203, one or more IoT devices 30 (collectively referred to as the IoT device 30), disposed at the site 20 where the IoT controller 24 is provided, starts transmitting the IoT device data to the IoT controller 24. As described above, the IoT controller 24 registers the IoT device 30 to be managed, before receiving the IoT device data. Further, in this embodiment, the IoT device data is log data of the IoT device 30.

At S204, the IoT controller 24 refers to the data filter policy, which is a part of the policy data, to apply filtering processing to the IoT device data collected from the IoT device 30. This filtering processing is determined based on a type of the IoT device 30 that the user is interested in having the report. For example, in the example case illustrated in FIG. 16, IoT devices 30 other than the electronic whiteboard, the projector, and the MFP are applied with filtering processing, such that no log data is collected for these IoT devices 30.

At S205, the IoT controller 24 stores the IoT device data, which has been processed.

At S206, the IoT controller 24 refers to the report policy, which is a part of the policy data, to apply filtering processing to the IoT device data that has been stored at S205. This filtering processing is determined based on various factors that have been previously set by the user to reflect individual circumstances of the user. Based on the IoT device data applied with filtering processing according to the report policy, the report data is generated for transmission to the IoT server 10. For example, referring to FIG. 16, the policy 1 is set to encrypt the operation data generated by the president at the electronic whiteboard, according to selection of the user desiring the high security level. In another example, the policy 2 is set to delete the operation data generated at the electronic whiteboard placed in the president room, according to selection of the user desiring the low level of detailedness of the report.

At S207, the IoT controller 24 transmits the report data, which is generated at S206, to the IoT server 10.

At S208, the IoT server 10 may change the policy data according to analysis of the report data. For example, if some log data contained in the report data is not useful in terms of data analysis, the IoT server 10 may modify the policy data, such as the data filter policy or the report policy, to filter out such log data that is determined as not useful. S208 may be performed at any time. Further, S208 may be performed at any device other than the IoT server 10 such as the client device 32 or the control panel 28, as long as update on the policy data is notified to the IoT server 10.

Further, the IoT server 10 collects log data from a plurality of IoT controllers 24 that have been registered for a specific organization, such as a company, and generates report data based on the collected log data. In response to a request, the IoT server 10 may transmit the report data to the client device 32 operated by the user, or any other device operated by the user. The time to transmit the report data may not be limited to a time when the request is received. The report data may be automatically transmitted to a specific destination, which may be previously registered, every predetermined time that is previously set.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

For example, the report policies can be made different among the IoT controllers 24 in the information processing system 1. Even if the same user operates under different environments (for example, different offices), the user is able to easily generate reports according to different report policies, as long as a report policy is individually set for each environment.

Further, instead of transmitting the log data directly from the IoT devices 30 to the IoT server 10, the IoT controller 24 connected to the same network on which the IoT devices 30 reside, collects the log data from the IoT devices 30, applies filtering processing to the collected log data according to the report policy, and transmits the processed log data as report data to the IoT server 10. Accordingly, there is no need to set a policy for each IoT device 30.

In any one of the above-described embodiments, the received data filtering processor 86 performs filtering processing on the IoT device data received from the IoT device 30 in accordance with the data filter policy, and stores the processed IoT device data in the device data storage 93. With applying filtering according to the data filter policy, an amount of IoT device data to be processed is greatly reduced.

Alternatively, in another embodiment, such filtering by the received data filtering processor 86 according to the data filter policy does not have to be performed. In such case, the IoT controller 24 of FIG. 7 does not have to be provided with the received data filtering processor 86 and the data filter policy storage 95.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus communicably connected with a server through a first network, the apparatus comprising:

a memory configured to store report policy information for determining filtering processing to be applied to log data to be transmitted to the server, the report policy information contains user information, location information, a device ID, data to be filtered, and a filtering process, the data to be filtered being at least a portion of the log data, the report policy information associating, for each one of one or more report policies available for use by the information processing apparatus, information defining a condition for applying filtering processing to the log data and information indicating a type of filtering processing to be applied to the log data, the information defining the condition for applying filtering processing including a type of the log data to be filtered and attribute information of a device that has executed processes that caused generation of the log data, the condition for applying filtering processing being one of a first condition, based on the user information, and a second condition, based on the location information; and circuitry configured to cause the information processing apparatus to, receive, from each of a plurality of devices through a second network different than the first network, log data indicating (1) a log of processes that have been executed by the device and (2) a user of the device, the log data identifying both the device and the user of the device, the plurality of devices and the information processing apparatus being on the second network;

specify, from among the received log data, log data that matches one of the first and second conditions for applying filtering processing of the report policy information;

apply filtering processing associated with the matched condition for applying filtering processing of the report policy information, to the specified log data, the filtering processing configured to protect a confidentiality related to a specific user or a specific location of the data to be filtered, when the matched condition is the first condition, the circuitry is configured to cause the information processing apparatus to perform a first filtering processing, and when the matched condition is the second condition, the circuitry is configured to cause the information processing apparatus to perform a second filtering processing, which is different from the first filtering processing; and transmit the log data to which the filtering processing is applied, to the server through the first network, the server being configured to store the log data received from the information processing apparatus.

2. The information processing apparatus of claim 1, wherein the circuitry is further configured to cause the information processing apparatus to:

transmit at least one of: an entity identifier for identifying an entity operating the information processing apparatus; and a device identifier for identifying the information processing apparatus, to the server to request for the report policy information available for use by the information processing apparatus; and receive, from the server, the report policy information that is associated with the at least one of the entity identifier and the device identifier that is transmitted from the information processing apparatus, wherein the circuitry stores the received report policy information in the memory.

3. The information processing apparatus of claim 2, wherein the one or more report policies of the report policy information that is received from the server includes at least one report policy that is set by a user of the entity so as to be specific to the entity, the setting operation including at least one of generating a new report policy, selecting a report policy that is previously prepared, and modifying the report policy that is previously prepared.

4. The information processing apparatus of claim 1, wherein the one or more report policies of the report policy information that is received from the server includes at least one report policy having contents being updated by a client device operated by a user, the client device being capable of accessing at least one of the server through the first network and the information processing apparatus through the second network.

5. The information processing apparatus of claim 1, wherein the attribute information of the device includes at least one of: the user information identifying a user who has operated the device to execute the processes; and the location information indicating a location where the device that has executed the processes is disposed.

6. The information processing apparatus of claim 1, wherein the memory further stores data filter policy information specifying, from among the plurality of devices each of which transmits log data, at least one device that the information processing apparatus is configured to store the log data in the memory, wherein the circuitry filters out the log data received from one or more other devices of the plurality of devices other than the at least one device specified with the data filter policy information, to store only the log data of the at least one device specified with the data filter policy information in the memory, and wherein the circuitry applies the filtering processing according to the filter policy information to the log data stored in the memory.

7. The information processing apparatus of claim 6, wherein the circuitry receives the report policy information and the data filter policy information, from the server through the first network.

8. The information processing apparatus of claim 1, further comprising:

an interface communicably connected with an interface of one device of the plurality of devices, the one device including a communication interface to communicate with the server via the first network, wherein the circuitry communicates with the server through the first network via the one device including the communication interface.

9. The information processing apparatus of claim 8, wherein the circuitry is an extension board that is incorporated in the one device including the communication interface.

10. The information processing apparatus of claim 1, wherein the information processing apparatus is an image forming apparatus.

11. The information processing apparatus of claim 1, wherein the second network is a local area network (LAN).

12. The information processing apparatus of claim 1, wherein the report policy information includes priorities associated with the report policies, respectively.

13. The information processing apparatus of claim 1, wherein the first filtering processing includes encrypting the data to be filtered.

14. The information processing apparatus of claim 1, wherein the second filtering processing includes one of deleting the data to be filtered or replacing a log of images in the log data with storage location information indicating a location where the images are stored.

15. An information processing system comprising:
a server, disposed on a first network, configured to collect log data from a plurality of information processing apparatuses; and
an information processing apparatus, disposed on a second network different than the first network, configured to transmit log data to the server, the information processing apparatus comprising,
a memory configured to store report policy information for determining filtering processing to be applied to the log data to be transmitted to the server, the report policy information contains user information, location information, a device ID, data to be filtered, and a filtering process, the data to be filtered being at least a portion of the log data,
the report policy information associating, for each one of one or more report policies available for use by the information processing apparatus, information defining a condition for applying filtering processing to the log data and information indicating a type of filtering processing to be applied to the log data,
the information defining the condition for applying filtering processing including a type of the log data to be filtered and attribute information of a device that has executed processes that caused generation of the log data, the condition for applying filtering processing being one of a first condition, based on the user information, and a second condition, based on the location information; and
circuitry configured to cause the information processing apparatus to,
receive, from each of a plurality of devices through the second network different than the first network, log data indicating (1) a log of processes that have been executed by the device and (2) a user of the device, the log data identifying both the device and the user of the device, the plurality of devices and the information processing apparatus being on the second network,
specify, from among the received log data, log data that matches one of the first and second conditions for applying filtering processing of the report policy information,
apply filtering processing associated with the matched condition for applying filtering processing of the report policy information, to the specified log data, the filtering processing configured to protect a confidentiality related to a specific user or a specific location of the data to be filtered,
when the matched condition is the first condition, the circuitry is configured to cause the information processing apparatus to perform a first filtering processing, and
when the matched condition is the second condition, the circuitry is configured to cause the information processing apparatus to perform a second filtering processing, which is different from the first filtering processing, and
transmit the log data to which the filtering processing is applied, to the server through the first network, the server being configured to store the log data received from the information processing apparatus.

16. The information processing system of claim 15,
wherein the server is configured to store, for each one of the plurality of information processing apparatuses, report policy information that is previously generated for the information processing apparatus, in association with identification information, the identification information identifying at least one of an entity operating the information processing apparatus and the information processing apparatus itself, and
in response to reception of the identification information from the information processing apparatus, the server is further configured to transmit the report policy information associated with the received identification information to the information processing apparatus that transmits the identification information.

17. The information processing system of claim 16,
wherein the server is configured to transmit a policy configuration screen to a client device operated by a user of the entity,
the policy configuration screen being configured to allow the user of the entity to set a report policy specific to the entity, the setting operation including generating a new report policy to be added to the report policy information, selecting a report policy that is previously prepared, and modifying the report policy that is previously prepared.

18. The information processing system of claim 15,
wherein the server is configured to transmit report data that is generated based on the log data that is received from the plurality of information processing apparatuses, to a client device operated by a user.

19. The information processing system of claim 15,
wherein the information processing apparatus is an image forming apparatus.

20. An information processing method, performed by an information processing apparatus communicably connected with a server through a first network, the method comprising:
storing, in a memory of the information processing apparatus, report policy information for determining filtering processing to be applied to log data to be transmitted to the server, the report policy information contains user information, location information, a device ID, data to be filtered, and a filtering process, the data to be filtered being at least a portion of the log data,
the report policy information associating, for each one of one or more report policies available for use by the information processing apparatus, information defining a condition for applying filtering processing to the log data and information indicating a type of filtering processing to be applied to the log data,
the information defining the condition for applying filtering processing including a type of the log data to be filtered and attribute information of a device that has executed processes that caused generation of the log data, the condition for applying filtering processing being one of a first condition, based on the user information, and a second condition, based on the location information;
receiving, from each of a plurality of devices through a second network different than the first network, log data indicating (1) a log of processes that have been executed by the device and (2) a user of the device, the log data identifying both the device and the user of the device, the plurality of devices and the information processing apparatus being on the second network;

specifying, from among the received log data, log data that matches one of the first and second conditions for applying filtering processing of the report policy information;

applying filtering processing associated with the matched condition for applying filtering processing of the report policy information, to the specified log data, the filtering processing configured to protect a confidentiality related to a specific user or a specific location of the data to be filtered, when the matched condition is the first condition, the filtering processing includes a first filtering processing, and when the matched condition is the second condition, the filtering processing includes a second filtering processing, which is different from the first filtering processing; and transmitting the log data to which the filtering processing is applied, to the server through the first network to cause the server to store the log data received from the information processing apparatus.

\* \* \* \* \*